(12) United States Patent
Li et al.

(10) Patent No.: US 11,363,586 B2
(45) Date of Patent: Jun. 14, 2022

(54) RESOURCE CONFIGURATION METHOD, APPARATUS, AND SYSTEM

(71) Applicant: Huawei Technologies Co., Ltd., Shenzhen (CN)

(72) Inventors: Xinxian Li, Shanghai (CN); Hao Tang, Shanghai (CN); Hua Li, Shanghai (CN); Yongzhao Cao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 68 days.

(21) Appl. No.: 16/925,364

(22) Filed: Jul. 10, 2020

(65) Prior Publication Data

US 2020/0344732 A1 Oct. 29, 2020

Related U.S. Application Data

(63) Continuation of application No. PCT/CN2018/117984, filed on Nov. 28, 2018.

(30) Foreign Application Priority Data

Jan. 12, 2018 (CN) .......................... 201810032352.3

(51) Int. Cl.
*H04W 74/08* (2009.01)
*H04L 5/00* (2006.01)
*H04W 56/00* (2009.01)
*H04W 76/10* (2018.01)
(Continued)

(52) U.S. Cl.
CPC ......... *H04W 72/042* (2013.01); *H04L 5/0053* (2013.01); *H04W 56/001* (2013.01); *H04W 74/006* (2013.01); *H04W 74/0833* (2013.01)

(58) Field of Classification Search
CPC ............ H04W 72/042; H04W 56/001; H04W 74/006; H04W 74/0833; H04L 5/0053; H04L 5/0064
See application file for complete search history.

(56) References Cited

U.S. PATENT DOCUMENTS

2013/0250902 A1    9/2013  Xu et al.
2018/0042052 A1    2/2018  Harjula et al.
2018/0227958 A1*  8/2018  Xiong ................. H04W 88/023
(Continued)

FOREIGN PATENT DOCUMENTS

CN      102036411 A    4/2011
CN      102769903 A   11/2012
(Continued)

OTHER PUBLICATIONS

3GPP TSG-RAN WG2 Meeting #100, R2-1712322 Reno, USA, Nov. 27-Dec. 1, 2017 Title: BWP issues for EN-DC completion.*
(Continued)

*Primary Examiner* — Faruk Hamza
*Assistant Examiner* — Abusayeed M Haque
(74) *Attorney, Agent, or Firm* — Slater Matsil, LLP

(57) ABSTRACT

This application discloses a resource configuration method, an apparatus, and a system, and relates to the field of communications technologies. The method includes: receiving PDCCH signaling; switching to a target uplink BWP; and sending a preamble sequence by using a PRACH resource included in the target uplink BWP, where the PDCCH signaling is used to trigger a random access procedure.

14 Claims, 10 Drawing Sheets

(51) Int. Cl.
*H04W 72/04* (2009.01)
*H04W 74/00* (2009.01)

(56) References Cited

U.S. PATENT DOCUMENTS

| | | | |
|---|---|---|---|
| 2018/0288808 A1 | 10/2018 | Liu et al. | |
| 2019/0141750 A1* | 5/2019 | Lee | H04W 74/0816 |
| 2019/0215712 A1* | 7/2019 | Babaei | H04W 24/10 |
| 2019/0356446 A1* | 11/2019 | Kim | H04W 72/0453 |
| 2021/0037487 A1* | 2/2021 | Ohara | H04W 72/044 |
| 2021/0045159 A1* | 2/2021 | Lei | H04W 74/0833 |
| 2021/0058971 A1* | 2/2021 | MolavianJazi | H04B 17/318 |
| 2021/0136823 A1* | 5/2021 | Kim | H04W 74/008 |

FOREIGN PATENT DOCUMENTS

| | | |
|---|---|---|
| CN | 102883439 A | 1/2013 |
| CN | 106550480 A | 3/2017 |
| CN | 107251640 A | 10/2017 |
| WO | 2012150499 A1 | 11/2012 |

OTHER PUBLICATIONS

Huawei et al., "Remaining issues for BWP", 3GPP TSG-RAN2 Meeting #100, R2-1712326, Reno, USA, Nov. 27-Dec. 1, 2017, 4 pages.
Huawei, et al., "BWP issues for EN-DC completion", 3GPP TSG-RAN WG2 Meeting #100, R2-1712322, Reno, USA, Nov. 27-Dec. 1, 2017, 5 pages.
LG Electronics Inc., "Summary of E-mail discussion on [99bis#43] [NR UP/MAC] Impact of BWP", 3GPP TSG-RAN WG2 Meeting #100, R2-1713879, Reno, USA, Nov. 27-Dec. 1, 2017, 35 pages.
LG Electronics, "RACH procedure", 3GPP TSG RAN WG1 Meeting NR#3, R1-1715846, Nagoya, Japan, Sep. 18-21, 2017, 7 pages.
QUALCOMM Incorporated, "Open Issues on BWP", 3GPP TSG RAN WG1 #91, R1-1720693, Reno, NV, USA, Nov. 27-Dec. 1, 2017, 15 pages.
Spreadtrum Communications, "Remaining issues on UL/DL BWP configuration", 3GPP TSG-RAN WG1#91, R1-1719698, Reno, USA, Nov. 27-Dec. 1, 2017, 3 pages.
3GPP TS 38.213 V15.0.0, "3rd Generation Partnership Project; Technical Specification Group Radio Access Network; NR; Physical layer procedures for control (Release 15)," Dec. 2017, 56 pages.
3GPP TS 38.321 V2.0.0, 3rd Generation Partnership Project; Technical Specification Group Radio Access Network; NR; Medium Access Control (MAC) protocol specification (Release 15), Dec. 2017, 55 pages.
Samsung (Rapporteur), "List of open issues on NR MAC," 3GPP TSG-RAN WG2 NR Ad Hoc, Vancouver, BC, Canada, Jan. 22-26, 2018, R2-1800612, 31 pages.

* cited by examiner

RESOURCE CONFIGURATION METHOD, APPARATUS, AND SYSTEM

CROSS-REFERENCE TO RELATED APPLICATIONS

This application is a continuation of International Application No. PCT/CN2018/117984, filed on Nov. 28, 2018, which claims priority to Chinese Patent Application No. 201810032352.3, filed on Jan. 12, 2018. The disclosures of the aforementioned applications are hereby incorporated by reference in their entireties.

TECHNICAL FIELD

This application relates to the field of communications technologies, and in particular, to a resource configuration method, an apparatus, and a system.

BACKGROUND

At present, a mechanism of communication between a terminal device and a base station is that the terminal device can receive downlink information sent by the base station only after the terminal device obtains downlink synchronization with the base station, and the based station can receive uplink information sent by the terminal device only after the terminal device obtains uplink synchronization with the base station. However, an uplink synchronization state of the terminal device may become out-of-synchronization with the base station in an uplink direction as the terminal device moves. As a result, the base station cannot receive the uplink information sent by the terminal device. The uplink synchronization may be implemented through a random access process. Therefore, the random access process is worth being studied.

SUMMARY

Embodiments of this application provide a resource configuration method, an apparatus, and a system, to help a terminal device initiate uplink synchronization, and reduce a possibility that a base station cannot receive uplink information sent by the terminal device after the terminal device is out-of-synchronization with the base station in an uplink direction.

According to a first aspect, an embodiment of this application provides a resource configuration method, including: receiving physical downlink control channel (PDCCH) signaling, where the PDCCH signaling is used to trigger a random access procedure; switching to a target uplink bandwidth part (BWP), where the target uplink BWP includes a physical random access channel (PRACH) resource; and sending a preamble sequence by using the PRACH resource included in the target uplink BWP.

In the embodiments of this application, the PDCCH signaling is introduced to trigger the sending of the preamble sequence on the target uplink BWP, so that when the terminal device is in an RRC_CONNECT state, uplink synchronization may be initiated when the terminal device is in an out-of-synchronization state in an uplink direction, thereby helping reduce a possibility that a base station cannot receive uplink information sent by the terminal device after the terminal device is out-of-synchronization with the base station in the uplink direction.

In a possible design, the target uplink BWP is an uplink BWP used for initial random access; or the target uplink BWP is a preconfigured uplink BWP, and the preconfigured uplink BWP includes the PRACH resource.

In a possible design, the PDCCH signaling includes an identifier of the target uplink BWP.

In a possible design, the preamble sequence may be sent by using the PRACH resource included in the target uplink BWP in the following manner: sending, in a first time unit, the preamble sequence by using the PRACH resource included in the target uplink BWP, where there is a first time between the first time unit and a second time unit, and the second time unit is a time unit in which the PDCCH signaling is received.

In a possible design, the first time is an absolute time, or the first time is k third time units, where duration of the third time unit is predefined or notified by using signaling, and k is a positive integer.

In a possible design, a subcarrier spacing corresponding to the first time unit is a subcarrier spacing of a downlink BWP used to send the PDCCH signaling, and a subcarrier spacing corresponding to the second time unit is a subcarrier spacing corresponding to the target uplink BWP.

In a possible design, the method further includes: receiving uplink timing advance TA; and sending data based on the TA. The foregoing technical solution helps increase a possibility for the base station to receive uplink data sent by the terminal device.

According to a second aspect, an embodiment of this application provides a resource configuration method, including: sending PDCCH signaling, where the PDCCH signaling is used to trigger a random access procedure; and then receiving a preamble sequence on a PRACH resource included in a target uplink BWP.

In a possible design, the target uplink BWP is an uplink BWP used for initial random access; or the target uplink BWP is a preconfigured uplink BWP, and the preconfigured uplink BWP includes the PRACH resource.

In a possible design, the PDCCH signaling includes an identifier of the target uplink BWP.

In a possible design, the method further includes: determining TA based on the preamble sequence; and sending the TA on a target downlink BWP. The target downlink BWP corresponds to the target uplink BWP, or the target downlink BWP is a currently activated downlink BWP.

According to a third aspect, an embodiment of this application provides an access method, including: sending a preamble sequence, where the preamble sequence is used to determine a terminal device identifier, and the terminal device identifier is used to identify a terminal device that sends the preamble sequence.

The foregoing technical solution helps identify the terminal device that sends the preamble sequence.

In a possible design, the preamble sequence carries the terminal device identifier.

In a possible design, a possible implementation in which the preamble sequence carries the terminal device identifier is that the preamble sequence is a sequence scrambled by using the terminal device identifier.

In a possible design, the preamble sequence is a preamble sequence in a preamble sequence set corresponding to the terminal device identifier.

According to a fourth aspect, an embodiment of this application provides an access method, including: receiving a preamble sequence; and determining a terminal device identifier based on the preamble sequence, where the terminal device identifier is used to identify a terminal device that sends the preamble sequence.

In a possible design, the preamble sequence carries the terminal device identifier.

In a possible design, a possible implementation in which the preamble sequence carries the terminal device identifier is that the preamble sequence is a sequence scrambled by using the terminal device identifier.

In a possible design, the preamble sequence is a preamble sequence in a preamble sequence set corresponding to the terminal device identifier.

According to a fifth aspect, an embodiment of this application provides an access method, including: sending a preamble sequence on a PRACH resource, where the PRACH resource corresponds to a terminal device, and the terminal device is a terminal device that sends the preamble sequence.

The foregoing technical solution helps identify the terminal device that sends the preamble sequence.

In a possible design, a possible implementation in which the PRACH resource corresponds to the terminal device is that the PRACH resource corresponds to a terminal device identifier.

According to a sixth aspect, an embodiment of this application provides an access method, including: receiving a preamble sequence on a PRACH resource; and determining a terminal device based on the PRACH resource, where the PRACH resource corresponds to the terminal device, and the terminal device is a terminal device that sends the preamble sequence.

In a possible design, a possible implementation in which the PRACH resource corresponds to the terminal device is that the PRACH resource corresponds to a terminal device identifier.

According to a seventh aspect, an embodiment of this application provides an access method, including: receiving a preamble sequence on a PRACH resource, where the PRACH resource corresponds to a first uplink BWP and a second uplink BWP; and sending an RAR on a first downlink BWP and a second downlink BWP, where the RAR includes a response corresponding to the preamble sequence, the first uplink BWP corresponds to the first downlink BWP, and the second uplink BWP corresponds to the second downlink BWP. With the foregoing technical solution, the terminal device can receive the RAR when a plurality of uplink BWPs cover PRACH resources, to implement uplink synchronization.

According to an eighth aspect, an embodiment of this application provides an apparatus, where the apparatus may be a terminal device, or may be an apparatus (such as a chip) in a terminal device. The apparatus has a function of implementing the technical solution according to the first aspect or the possible designs in the first aspect. The function may be implemented by hardware, or may be implemented by hardware executing corresponding software. The hardware or software includes one or more modules corresponding to the function.

In a possible design, the apparatus includes a transceiver module and a processing module. The transceiver module is configured to receive PDCCH signaling, where the PDCCH signaling is used to trigger a random access procedure. The processing module is configured to switch to a target uplink BWP, where the target uplink BWP includes a PRACH resource. The transceiver module is further configured to send a preamble sequence by using the PRACH resource included in the target uplink BWP.

In a possible design, for a specific implementation of triggering, by using the PDCCH signaling, the switching to the target uplink BWP, refer to the technical solution in the possible designs in the first aspect. Details are not described herein again.

In a possible design, the transceiver module may send the preamble sequence by using the PRACH resource included in the target uplink BWP in the following manner, and is specifically configured to: send, in a first time unit, the preamble sequence by using the PRACH resource included in the target uplink BWP, where there is a first time between the first time unit and a second time unit, and the second time unit is a time unit in which the PDCCH signaling is received.

In a possible design, the transceiver module is further configured to: receive uplink timing advance TA; and send data based on the TA.

In a possible design, the apparatus includes a processor, configured to implement the function in the first aspect or the possible designs in the first aspect. The apparatus may further include a memory, configured to store a program instruction and data. The memory is coupled to the processor, and the processor may invoke and execute the program instruction stored in the memory, to implement the function in the first aspect or the possible designs in the first aspect. The apparatus may further include a communications interface, and the communications interface is configured for data transmission, communication, or information exchange between the apparatus and another device. For example, the another device is a network device or another terminal device.

Specifically, the memory is configured to store a program instruction. The processor is configured to invoke and execute the program instruction stored in the memory, and receive or send information by using the communications interface, to implement the function in the first aspect or the possible designs in the first aspect.

According to a ninth aspect, an embodiment of this application provides an apparatus, where the apparatus may be a network device, or may be an apparatus (such as a chip) in a network device. The apparatus has a function of implementing the technical solution according to the second aspect or the possible designs in the second aspect. The function may be implemented by hardware, or may be implemented by hardware executing corresponding software. The hardware or software includes one or more modules corresponding to the function.

In a possible design, the apparatus includes a transceiver module and a processing module. The processing module is configured to send PDCCH signaling and receive a preamble sequence on a PRACH resource included in a target uplink bandwidth part BWP by using the transceiver module, where the PDCCH signaling is used to trigger a random access procedure.

In a possible design, the processing module is further configured to determine TA based on the preamble sequence; and the transceiver module is further configured to send the TA on a target downlink BWP. The target downlink BWP corresponds to the target uplink BWP, or the target downlink BWP is a currently activated downlink BWP.

In a possible design, for a specific implementation of triggering, by using the PDCCH signaling, the switching to the target uplink BWP, refer to the technical solution in the possible designs in the second aspect. Details are not described herein again.

In a possible design, the apparatus includes a processor, configured to implement the function in the second aspect or the possible designs in the second aspect. The apparatus may further include a memory, configured to store a program instruction and data. The memory is coupled to the processor, and the processor may invoke and execute the program instruction stored in the memory, to implement the function in the second aspect or the possible designs in the second aspect. The apparatus may further include a communications interface, and the communications interface is configured for data transmission, communication, or information exchange between the apparatus and another device. For example, the another device is a terminal device.

Specifically, the memory is configured to store a program instruction. The processor is configured to invoke and execute the program instruction stored in the memory, and receive or send information by using the communications interface, to implement the function in the second aspect or the possible designs in the second aspect.

According to a tenth aspect, an embodiment of this application provides an apparatus, where the apparatus may be a terminal device, or may be an apparatus (such as a chip) in a terminal device. The apparatus has a function of implementing the technical solution according to the third aspect or the possible designs in the third aspect. The function may be implemented by hardware, or may be implemented by hardware executing corresponding software. The hardware or software includes one or more modules corresponding to the function.

In a possible design, the apparatus includes a transceiver module and a processing module. The processing module is configured to send a preamble sequence by using the transceiver module, where the preamble sequence is used to determine a terminal device identifier, and the terminal device identifier is used to identify a terminal device that sends the preamble sequence.

In a possible design, for a specific implementation in which the preamble sequence is used to determine the terminal device identifier, refer to the technical solution in the possible designs in the third aspect. Details are not described herein again.

In a possible design, the apparatus includes a processor, configured to implement the function in the third aspect or the possible designs in the third aspect. The apparatus may further include a memory, configured to store a program instruction and data. The memory is coupled to the processor, and the processor may invoke and execute the program instruction stored in the memory, to implement the function in the third aspect or the possible designs in the third aspect. The apparatus may further include a communications interface, and the communications interface is configured for data transmission, communication, or information exchange between the apparatus and another device. For example, the another device is a network device or another terminal device.

Specifically, the memory is configured to store a program instruction. The processor is configured to invoke and execute the program instruction stored in the memory, and receive or send information by using the communications interface, to implement the function in the third aspect or the possible designs in the third aspect.

According to an eleventh aspect, an embodiment of this application provides an apparatus, where the apparatus may be a network device, or may be an apparatus (such as a chip) in a network device. The apparatus has a function of implementing the technical solution according to the fourth aspect or the possible designs in the fourth aspect. The function may be implemented by hardware, or may be implemented by hardware executing corresponding software. The hardware or software includes one or more modules corresponding to the function.

In a possible design, the apparatus includes a transceiver module and a processing module. The transceiver module is configured to receive a preamble sequence. The processing module is configured to determine a terminal device identifier based on the preamble sequence, and the terminal device identifier is used to identify a terminal device that sends the preamble sequence.

In a possible design, for a specific implementation of determining the terminal device identifier based on the preamble sequence, refer to the technical solution in the possible designs in the fourth aspect. Details are not described herein again.

In a possible design, the apparatus includes a processor, configured to implement the function in the fourth aspect or the possible designs in the fourth aspect. The apparatus may further include a memory, configured to store a program instruction and data. The memory is coupled to the processor, and the processor may invoke and execute the program instruction stored in the memory, to implement the function in the fourth aspect or the possible designs in the fourth aspect. The apparatus may further include a communications interface, and the communications interface is configured for data transmission, communication, or information exchange between the apparatus and another device. For example, the another device is a terminal device.

Specifically, the memory is configured to store a program instruction. The processor is configured to invoke and execute the program instruction stored in the memory, and receive or send information by using the communications interface, to implement the function in the fourth aspect or the possible designs in the fourth aspect.

According to a twelfth aspect, an embodiment of this application provides an apparatus, where the apparatus may be a terminal device, or may be an apparatus (such as a chip) in a terminal device. The apparatus has a function of implementing the technical solution according to the fifth aspect or the possible designs in the fifth aspect. The function may be implemented by hardware, or may be implemented by hardware executing corresponding software. The hardware or software includes one or more modules corresponding to the function.

In a possible design, the apparatus includes a transceiver module and a processing module. The processing module is configured to send a preamble sequence on a PRACH resource by using the transceiver module, where the PRACH resource corresponds to a terminal device, and the terminal device is a terminal device that sends the preamble sequence.

In a possible design, for a specific implementation in which the PRACH resource corresponds to the terminal device, refer to the technical solution in the possible designs in the fifth aspect. Details are not described herein again.

In a possible design, the apparatus includes a processor, configured to implement the function in the fifth aspect or the possible designs in the fifth aspect. The apparatus may further include a memory, configured to store a program instruction and data. The memory is coupled to the processor, and the processor may invoke and execute the program instruction stored in the memory, to implement the function in the fifth aspect or the possible designs in the fifth aspect. The apparatus may further include a communications interface, and the communications interface is configured for data transmission, communication, or information exchange between the apparatus and another device. For example, the another device is a network device or another terminal device.

Specifically, the memory is configured to store a program instruction. The processor is configured to invoke and execute the program instruction stored in the memory, and receive or send information by using the communications interface, to implement the function in the fifth aspect or the possible designs in the fifth aspect.

According to a thirteenth aspect, an embodiment of this application provides an apparatus, where the apparatus may be a network device, or may be an apparatus (such as a chip) in a network device. The apparatus has a function of implementing the technical solution according to the sixth aspect or the possible designs in the sixth aspect. The function may be implemented by hardware, or may be implemented by hardware executing corresponding software. The hardware or software includes one or more modules corresponding to the function.

In a possible design, the apparatus includes a transceiver module and a processing module. The transceiver module is configured to receive a preamble sequence on a PRACH resource. The processing module is configured to determine a terminal device based on the PRACH resource, where the PRACH resource corresponds to the terminal device, and the terminal device is a terminal device that sends the preamble sequence.

In a possible design, for a specific implementation in which the PRACH resource corresponds to the terminal device, refer to the technical solution in the possible designs in the sixth aspect. Details are not described herein again.

In a possible design, the apparatus includes a processor, configured to implement the function in the sixth aspect or the possible designs in the sixth aspect. The apparatus may further include a memory, configured to store a program instruction and data. The memory is coupled to the processor, and the processor may invoke and execute the program instruction stored in the memory, to implement the function in the sixth aspect or the possible designs in the sixth aspect. The apparatus may further include a communications interface, and the communications interface is configured for data transmission, communication, or information exchange between the apparatus and another device. For example, the another device is a terminal device.

Specifically, the memory is configured to store a program instruction. The processor is configured to invoke and execute the program instruction stored in the memory, and receive or send information by using the communications interface, to implement the function in the sixth aspect and the possible designs in the sixth aspect.

According to a fourteenth aspect, an embodiment of this application provides an apparatus, where the apparatus may be a network device, or may be an apparatus (such as a chip) in a network device. The apparatus has a function of implementing the technical solution according to the seventh aspect or the possible designs in the seventh aspect. The function may be implemented by hardware, or may be implemented by hardware executing corresponding software. The hardware or software includes one or more modules corresponding to the function.

In a possible design, the apparatus includes a transceiver module and a processing module. The processing module receives a preamble sequence on a PRACH resource by using the transceiver module, and sends an RAR on a first downlink BWP and a second downlink BWP, where the PRACH resource corresponds to a first uplink BWP and a second uplink BWP, the RAR includes a response corresponding to the preamble sequence, the first uplink BWP corresponds to the first downlink BWP, and the second uplink BWP corresponds to the second downlink BWP.

In a possible design, the apparatus includes a processor, configured to implement the function in the seventh aspect or the possible designs in the seventh aspect. The apparatus may further include a memory, configured to store a program instruction and data. The memory is coupled to the processor, and the processor may invoke and execute the program instruction stored in the memory, to implement the function in the seventh aspect or the possible designs in the seventh aspect. The apparatus may further include a communications interface, and the communications interface is configured for communication between the apparatus and another device. For example, the another device is a terminal device.

Specifically, the memory is configured to store a program instruction. The processor is configured to invoke and execute the program instruction stored in the memory, and receive or send information by using the communications interface, to implement the function in the seventh aspect or the possible designs in the seventh aspect.

According to a fifteenth aspect, an embodiment of this application further provides a computer-readable storage medium, including a program instruction, and when the program instruction is run on a computer, the computer is enabled to perform the method according to any one of the first aspect or the possible designs in the first aspect.

According to a sixteenth aspect, an embodiment of this application further provides a computer-readable storage medium, including a program instruction, and when the program instruction is run on a computer, the computer is enabled to perform the method according to any one of the second aspect or the possible designs in the second aspect.

According to a seventeenth aspect, an embodiment of this application further provides a computer-readable storage medium, including a program instruction, and when the program instruction is run on a computer, the computer is enabled to perform the method according to any one of the third aspect or the possible designs in the third aspect.

According to an eighteenth aspect, an embodiment of this application further provides a computer-readable storage medium, including a program instruction, and when the program instruction is run on a computer, the computer is enabled to perform the method according to any one of the fourth aspect or the possible designs in the fourth aspect.

According to a nineteenth aspect, an embodiment of this application further provides a computer-readable storage medium, including a program instruction, and when the program instruction is run on a computer, the computer is enabled to perform the method according to any one of the fifth aspect or the possible designs in the fifth aspect.

According to a twentieth aspect, an embodiment of this application further provides a computer-readable storage medium, including a program instruction, and when the program instruction is run on a computer, the computer is enabled to perform the method according to any one of the sixth aspect or the possible designs in the sixth aspect.

According to a twenty-first aspect, an embodiment of this application further provides a computer-readable storage medium, including a program instruction, and when the program instruction is run on a computer, the computer is enabled to perform the method according to any one of the seventh aspect or the possible designs in the seventh aspect.

According to a twenty-second aspect, an embodiment of this application provides a chip system, where the chip system includes a processor, may further include a memory, and is configured to implement a function of the network device in the foregoing method. The chip system may include a chip, or may include a chip and another discrete device.

According to a twenty-third aspect, an embodiment of this application provides a chip system, where the chip system includes a processor, may further include a memory, and is configured to implement a function of the terminal device in the foregoing method. The chip system may include a chip, or may include a chip and another discrete device.

According to a twenty-fourth aspect, an embodiment of this application provides a communications system, where the communications system includes the apparatus according to any one of the eighth aspect or the possible designs in the eighth aspect and the apparatus according to any one of the ninth aspect or the possible designs in the ninth aspect.

According to a twenty-fifth aspect, an embodiment of this application provides a communications system, where the communications system includes the apparatus according to any one of the tenth aspect or the possible designs in the tenth aspect and the apparatus according to any one of the eleventh aspect or the possible designs in the eleventh aspect.

According to a twenty-sixth aspect, an embodiment of this application provides a communications system, where the communications system includes the apparatus according to any one of the twelfth aspect or the possible designs in the twelfth aspect and the apparatus according to any one of the thirteenth aspect or the possible designs in the thirteenth aspect.

According to a twenty-seventh aspect, an embodiment of this application provides a communications system, where the communications system includes the apparatus according to any one of the fourteenth aspect and the possible designs in the fourteenth aspect.

DETAILED DESCRIPTION OF ILLUSTRATIVE EMBODIMENTS

Figure 1:
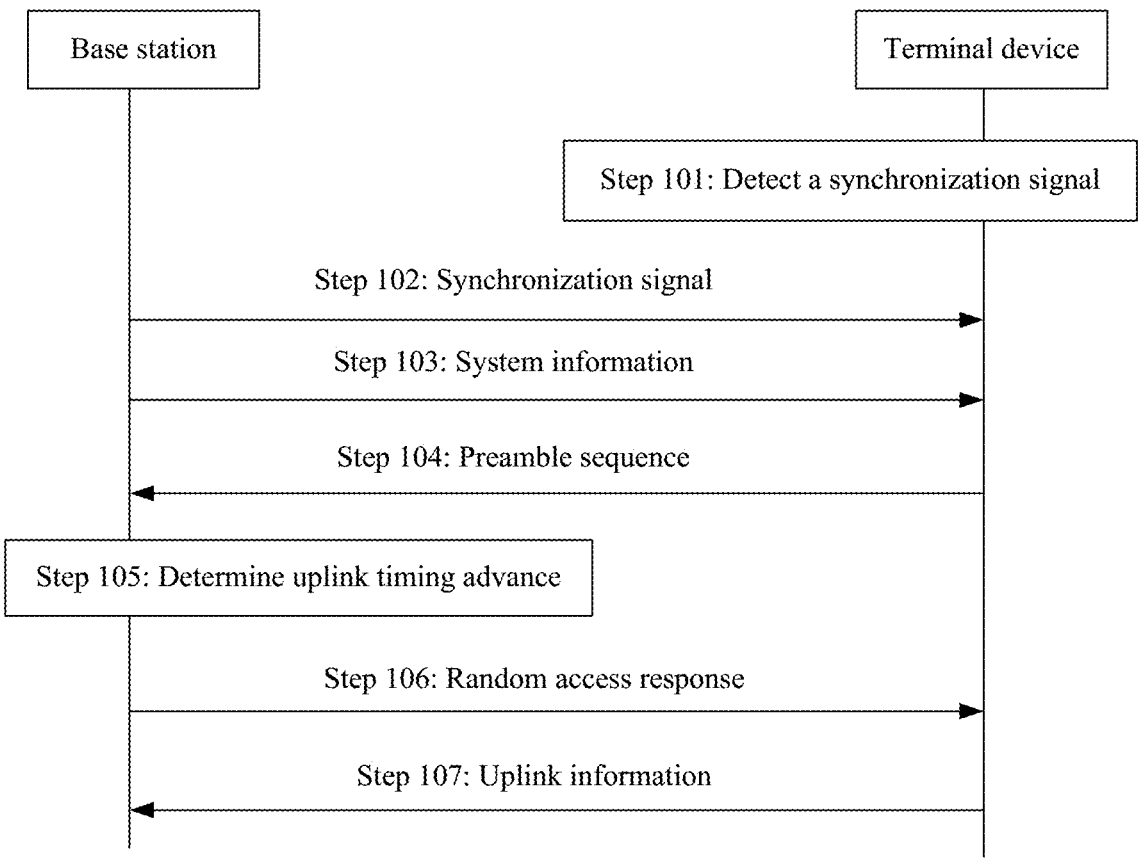
FIG. 1 is a schematic diagram of an initial access procedure according to an embodiment of this application.

In a wireless communications system, an initial access procedure of a terminal device may be shown in FIG. 1, and includes the following steps.

Step 101: The terminal device performs detection on a synchronization signal (SS) sent by a base station. The SS may include a primary synchronization signal (PSS) and a secondary synchronization signal (SSS).

Step 102: After detecting the SS sent by the base station, the terminal device receives the SS and implements downlink synchronization with the base station.

Step 103: The terminal device receives system information sent by the base station. The system information may be common information sent by the base station to the terminal device, and the common information may be sent in one or more pieces of information. This is not limited in this application. For example, the system information includes a master information block (MIB) and a system information block (SIB). Specifically, the master information block may be sent on a physical broadcast channel (PBCH). The MIB may include a limited quantity of parameters that are most important and frequently sent. The SIB may be sent on a physical downlink shared channel (PDSCH), and includes some common radio resource configuration information. For example, a PRACH resource is indicated in the SIB, and the PRACH resource is used for sending a preamble sequence.

Step 104: The terminal device sends the preamble sequence to the base station on the PRACH resource indicated by the system information.

Step 105: After receiving the preamble sequence, the base station may determine uplink timing advance (TA) of the terminal device based on the preamble sequence.

Step 106: The base station sends a random access response (RAR) to the terminal device, where the RAR includes the TA.

Step 107: After receiving the RAR, the terminal device sends uplink information to the base station based on the TA included in the RAR.

According to step 104 to step 107, the terminal device implements synchronization with the base station in an uplink direction, facilitating basic alignment of times for arriving, at the base station, of uplink information of different terminal devices in one subframe within coverage of the base station, and interference between symbols of the different terminal devices in the uplink direction within coverage of the base station may be minimized.

In an initial random access process, the terminal device may receive the RAR in the following manners.

The terminal device performs detection on RAR control information, and receives RAR data information based on the RAR control information after detecting the RAR control information. For example, the terminal device may perform detection on the RAR control information on a resource indicated by RAR control resource information included in the system information or on a control resource set corresponding to the system information.

A random access process includes a contention-based random access process and a non-contention based random access process. For the contention-based random access process, in step 104, the preamble sequence sent by the terminal device to the base station is a random access preamble sequence, to notify the base station that there is a random access request, and then step 105 is performed. In the contention-based random access process, the terminal device listens to the RAR in an RAR time window. If the RAR is not detected, it is considered that uplink synchronization fails. If the RAR is detected, the terminal device sends an Msg3 to the base station. The Msg3 includes a terminal device identifier. After receiving the Msg3, the base station determines a terminal device that is successful in random access, and sends an Msg4 to the terminal device that is successful in random access. For the non-contention based random access process, in step 104, the preamble sequence sent by the terminal device to the base station may be a preamble sequence specific to the terminal device.

After the terminal device is connected, because a time at which the uplink information sent by the terminal device to the base station arrives at the base station may change with time, the terminal device needs to update the TA by sending the preamble sequence to the base station continuously, to maintain an uplink synchronization state with the base station.

If the terminal device supports a carrier bandwidth, an available frequency domain resource configured by the base station for the terminal device may be an entire carrier bandwidth, and the carrier bandwidth includes a PRACH resource. Therefore, the terminal device may also send the preamble sequence to the base station on the PRACH resource based on a requirement after the terminal device is connected and in an RRC_CONNECT state, to update the TA. It should be noted that the PRACH resource may be the same as or may be different from a PRACH resource indicated in the system information in the initial access process of the terminal device. A manner in which the terminal device receives the RAR is also similar to a manner in which the terminal device receives the RAR in the initial access process. Details are not described herein again.

However, as a quantity of mobile users increase and large-capacity services (such as a high-definition video service) emerge, an important aspect of evolution of the mobile communications technology to the fifth generation mobile communications technology (5th generation, 5G) is to support a large carrier bandwidth. A larger carrier bandwidth indicates that a larger quantity of bandwidth resources are used for data transmission, and a larger service volume can be supported. In a communications system with a large carrier bandwidth, because a larger bandwidth supported by a terminal device indicates a stronger processing capability of the terminal device and may indicate a higher data transmission rate of the terminal device, design costs of the terminal device may be correspondingly increased. In consideration of the costs of the terminal device and a service volume of the terminal device, the bandwidth supported by the terminal device may be less than the carrier bandwidth. For example, in a next radio (NR) system, a maximum carrier bandwidth may be 400 MHz (MHz), and a radio frequency bandwidth capability of a terminal device may be 20 MHz, 50 MHz, 100 MHz, or the like. In a wireless communications system, radio frequency bandwidth capabilities of different terminal devices may be the same or different.

Figure 2:
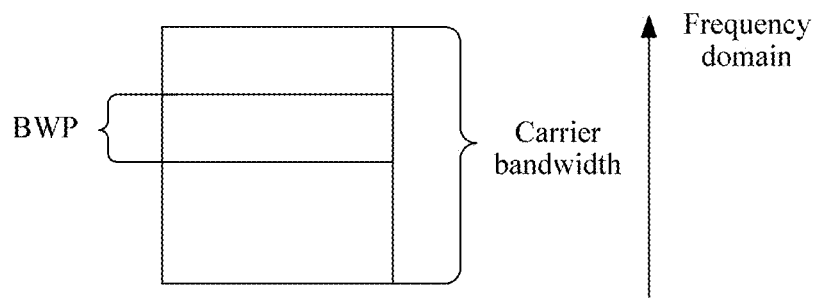
FIG. 2 is a schematic diagram of a BWP according to an embodiment of this application.

In the communications system with a large carrier bandwidth, because a radio frequency bandwidth capability of the terminal device is less than the carrier bandwidth, to ensure normal communication of the terminal device, a BWP (also referred to as a carrier bandwidth part, carrier bandwidth part) is introduced, and the BWP may include some contiguous or noncontiguous resources or all resources in the carrier bandwidth. For example, the BWP may include a plurality of contiguous resource blocks (RB) in frequency domain, as shown in FIG. 2.

To support more service types and communication scenarios, the BWP is designed to support a plurality of parameters. For different service types and/or communication scenarios, a parameter of the BWP may be set independently. The parameter includes at least one of a subcarrier spacing and a cyclic prefix (CP). A name of the parameter may also be referred to as numerology. The base station may configure a plurality of BWPs for one terminal device, and a numerology may be independently configured for each BWP, to support a plurality of service types and communication scenarios. Absolute duration of time units corresponding to different numerologies are different. For example, duration of a time unit corresponding to a subcarrier spacing of 15 kHz may be 1 ms, and duration of a time unit corresponding to a subcarrier spacing of 30 kHz may be 0.5 ms. Quantities of symbols corresponding to different subcarrier spacings may be the same or different. This is not limited. For example, a quantity of symbols corresponding to the subcarrier spacing of 15 kHz is 14, and a quantity of symbols corresponding to the subcarrier spacing of 30 kHz is also 14. The time unit is a time interval from a start of one transmission to a start of a next transmission, and may be a subframe, a slot, or a transmission time interval.

In the NR system, the base station may configure one or more downlink BWPs and one or more uplink BWPs for the terminal device. If the base station configures a plurality of uplink BWPs for the terminal device, because the BWPs are a part of the carrier bandwidth, not all BWPs include a PRACH resource. When the terminal device is in an RRC_CONNECT state after initial access is completed, if the terminal device is out-of-synchronization with the base station in an uplink direction, how the terminal device implements uplink synchronization or how the base station completes terminal device positioning is worth being studied.

An optional implementation is as follows: All uplink BWPs that are configured by the base station for the terminal device include a PRACH resource. In this manner, although the terminal device may send a preamble sequence to the base station on the PRACH resource based on a requirement, a waste of resources is caused.

Figure 3:
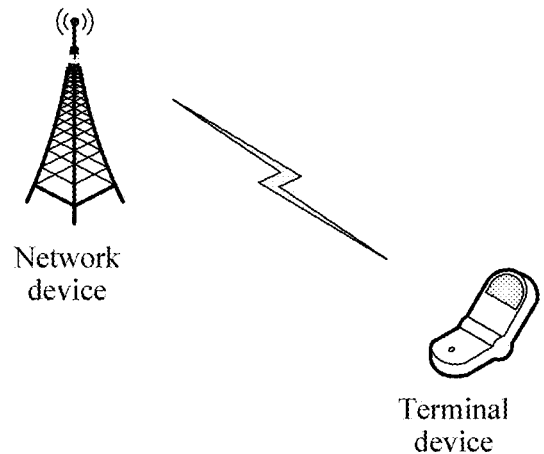
FIG. 3 is a schematic architectural diagram of a communications system according to an embodiment of this application.

To avoid the waste of resources, this application provides a resource configuration method. It should be understood that the resource configuration method provided in the embodiment of this application may be applied to a communications system architecture shown in FIG. 3. The communications system architecture includes a network device and a terminal device. The network device may be a radio access network device. Specifically, the radio access network device may be a device that communicates with a wireless terminal on an air interface in an access network by using one or more sectors, and is configured to coordinate attribute management of the air interface, for example, an evolved NodeB in LTE or a base station/or an access point in NR. This is not limited in this application. It should be noted that the network device in the communications system architecture shown in FIG. 3 may alternatively be a relay device, another network element device that has a function of the radio access network device, or the like. The terminal device may be a wireless terminal or a wired terminal.

The terminal device in the embodiments of this application may also be referred to as a terminal, and is a device with a wireless sending and receiving function. The terminal may be deployed on land, including indoor or outdoor, handheld, or in-vehicle deployment; or may be deployed on water (for example, on a ship); or may be deployed in air (for example, on an airplane, a balloon, or a satellite). The terminal device may be user equipment (UE), where the UE includes a handheld device, an in-vehicle device, a wearable device, or a computing device that has a wireless communication function. For example, the UE may be a mobile phone, a tablet computer, or a computer with a wireless sending and receiving function. The terminal device may alternatively be a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in a smart city, a wireless terminal in a smart home, or the like. In the embodiments of this application, an apparatus implementing a function of a terminal may be a terminal, or may be an apparatus supporting the terminal in implementing the function. In the embodiments of this application, an example in which the apparatus implementing a function of the terminal is a terminal and the terminal is UE is used to describe the technical solution provided in the embodiments of this application.

The network device in the embodiments of this application includes a base station (BS), which is a device that is deployed in a radio access network and that communicates wirelessly with a terminal. The base station may be in a plurality of forms, such as a macro base station, a micro base station, a relay node, and an access point. For example, the base station in the embodiments of this application may be a base station in a 5G system or a base station in a long term evolution (LTE) system. The base station in the 5G system may also be referred to as a transmission reception point (TRP) or a gNB. In the embodiments of this application, an apparatus implementing a function of the network device may be a network device, or may be an apparatus supporting the network device in implementing the function. In the embodiments of this application, an example in which the apparatus implementing a function of the network device is a network device and the network device is a base station is used to describe the technical solution provided in the embodiments of this application.

The following describes a resource configuration method in the embodiments of this application in detail by using a base station and a terminal device as execution bodies. In the embodiments of this application, an apparatus implementing a function of a terminal may be a terminal, or may be an apparatus supporting the terminal in implementing the function; and an apparatus implementing a function of a network device may be a network device, or may be an apparatus supporting the network device in implementing the function. For example, the execution bodies of this embodiment of this application may alternatively be a chip in the base station and a chip in the terminal device. When the execution bodies is a chip in the base station and a chip in the terminal device, the resource configuration method is similar to that when the execution bodies is a base station and a terminal device. Details are not described herein again.

Figure 4:
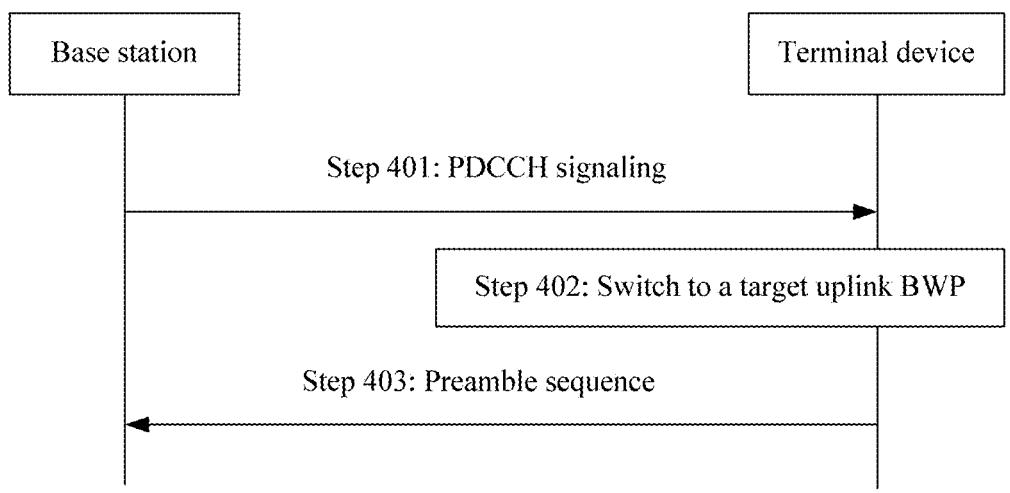
FIG. 4 is a schematic flowchart of a resource configuration method according to an embodiment of this application.

As shown in FIG. 4, the resource configuration method in this embodiment of this application includes the following steps.

Step 401: A base station sends PDCCH signaling to a terminal device, where the PDCCH signaling is used to trigger a random access procedure.

It should be noted that the PDCCH signaling may be alternatively referred to as downlink control signaling, uplink synchronization triggering signaling, random access triggering signaling, a PDCCH order, or the like. A name of the PDCCH signaling is not limited in the embodiments of this application. In addition, the PDCCH signaling in the embodiments of this application is physical layer signaling, and may be understood as signaling transmitted on a PDCCH, such as downlink control information DCI. In addition, step 401 may be further replaced with: A base station sends higher layer signaling to a terminal device, where the higher layer signaling is used to trigger a random access procedure. For example, the higher layer signaling may be radio resource control (RRC) signaling or media access control control element (MAC CE) signaling. This is not limited. Fallback DCI is mainly used to fall back to a relatively stable transmission with relatively high reliability (for example, during RRC reconfiguration, DCI formats 0 and 1A in an LTE system, and DCI formats 0_0 and 0_1 in an NR system) when link quality in a communications system suddenly deteriorates.

Specifically, when the PDCCH signaling is downlink fallback DCI, step 401 may be understood as: The base station sends downlink fallback DCI to the terminal device, where the downlink fallback DCI is used to trigger the random access procedure.

It should be noted that, in the communications system, the fallback DCI may include uplink fallback DCI and downlink fallback DCI, where a bit quantity of a resource allocation field in the downlink fallback DCI is the same as a bit quantity of a resource allocation field in the uplink fallback DCI. An embodiment of this application further provides several manners for determining the bit quantity of the resource allocation field in the downlink fallback DCI. The several manners for determining the bit quantity of the resource allocation field in the downlink fallback DCI may not be implemented in combination with other methods provided in the embodiments of this application, or may be implemented in combination with other methods provided in the embodiments of this application. This is not limited in this application. The other methods may be the methods in FIG. 4 to FIG. 9.

Manner 1: A first bit quantity is determined based on a size of an initial access downlink BWP on a carrier, and a second bit quantity is determined based on a size of an initial access uplink BWP on a carrier. Therefore, the bit quantity of the resource allocation field in the downlink fallback DCI is a relatively large value in the first bit quantity and the second bit quantity. In this case, the bit quantity of the resource allocation field in the uplink fallback DCI is also a relatively large value in the first bit quantity and the second bit quantity.

For example, the first bit quantity may meet expression (1):

$$c = \lceil \log_2(N_{RB}^{DL,BWP}(N_{RB}^{DL,BWP}+1)2) \rceil; \qquad (1)$$

where c is the first bit quantity; and $N_{RB}^{DL,\,BWP}$ is the size of the initial access downlink BWP on the carrier.

The second bit quantity may meet expression (2):

$$a = \lceil \log_2(N_{RB}^{UL,BWP}(N_{RB}^{UL,BWP}+1)/2) \rceil; \quad (2)$$

where a is the second bit quantity; and $N_{RB}^{UL, BWP}$ is the size of the initial access uplink BWP on the carrier.

Manner 2: A first bit quantity is determined based on a size of an initial access downlink BWP on a carrier, and a third bit quantity is determined based on a size of an initial access uplink BWP on a supplementary uplink resource. Therefore, the bit quantity of the resource allocation field in the downlink fallback DCI is a relatively large value in the first bit quantity and the third bit quantity. In this case, the bit quantity of the resource allocation field in the uplink fallback DCI is also a relatively large value in the first bit quantity and the third bit quantity.

For example, the first bit quantity may meet expression (1), and the third bit quantity may meet expression (3):

$$b = \lceil \log_2(N_{RB}^{SUL,BWP}(N_{RB}^{SUL,BWP}+1)/2) \rceil; \quad (3)$$

where b is the third bit quantity; and $N_{RB}^{SUL, BWP}$ is the size of the initial access uplink BWP on the supplementary uplink carrier.

Manner 3: A first bit quantity is determined based on a size of an initial access downlink BWP on a carrier, a second bit quantity is determined based on a size of an initial access uplink BWP on a carrier, and a third bit quantity is determined based on a size of an initial access uplink BWP on a supplementary uplink resource. Therefore, the bit quantity of the resource allocation field in the downlink fallback DCI is a maximum value in the first bit quantity, the second bit quantity, and the third bit quantity. In this case, the bit quantity of the resource allocation field in the uplink fallback DCI is also a maximum value in the first bit quantity, the second bit quantity, and the third bit quantity.

For example, the first bit quantity may meet expression (1), the second bit quantity may meet expression (2), and the third bit quantity may meet expression (3).

Manner 4: A bit quantity of a resource allocation field in the downlink fallback DCI and/or a bit quantity of a resource allocation field in the uplink fallback DCI are/is preconfigured as a predefined bit quantity. For example, the predefined bit quantity is 20, or a quantity of physical resource blocks that are predefined for calculating the bit quantity of the resource allocation field is 20. Alternatively, the base station or another network device notifies the terminal device of the bit quantity of the resource allocation field in the downlink fallback DCI and/or the bit quantity of the resource allocation field in the uplink fallback DCI. Optionally, the base station or another network device notifies, in an Msg4, the terminal device of the bit quantity of the resource allocation field in the downlink fallback DCI and/or the bit quantity of the resource allocation field in the uplink fallback DCI.

It should be noted that a supplementary uplink (SUL) resource in manner 2 and manner 3 of the embodiments of this application may be, for example, an SUL carrier or an SUL frequency, where the SUL resource means that only an uplink resource is used for transmission in a current communications standard. For example, for a carrier, only an uplink resource is used for transmission. For example, in a fifth generation (5G) mobile communications system, which is also referred to as a new radio (NR) communications system, if a carrier A is used only for uplink transmission in the NR, and the carrier A is not used for downlink transmission or the carrier A is used for downlink transmission in a long term evolution (LTE) communications system but is not used for downlink transmission in the NR, the carrier A is an SUL resource.

It should be understood that, after the terminal device accesses the base station, the base station may periodically trigger sending the PDCCH signaling or the higher layer signaling to the terminal device, to ensure that the terminal device keeps an uplink synchronization state, or the base station may trigger, based on an event, sending the PDCCH signaling or the higher layer signaling to the terminal device. For example, if after the base station sends downlink information to the terminal device, the base station does not receive, within a preset period, a response or feedback information sent by the terminal device, it is considered that the terminal device is out-of-synchronization in an uplink direction, and the base station sends the PDCCH signaling or the higher layer signaling to the terminal device.

Step 402: After receiving the PDCCH signaling, the terminal device switches to a target uplink BWP, where the target uplink BWP includes a PRACH resource.

It should be noted that, when a currently activated uplink BWP of the terminal device includes the PRACH resource, the target uplink BWP is the currently activated uplink BWP. In this case, the terminal device does not need to perform a switching action. It should be understood that the currently activated uplink BWP refers to a frequency domain resource used by the terminal device to send uplink information to the base station.

If the currently activated uplink BWP of the terminal device does not include the PRACH resource, the terminal device switches from the currently activated uplink BWP to the target uplink BWP.

Example 1: The target uplink BWP may be an uplink BWP used for initial access. The uplink BWP used for initial access may be referred to as an initial active UL BWP. A name of the uplink BWP used for initial access is not limited in the embodiments of this application.

Example 2: The target uplink BWP may alternatively be a preconfigured uplink BWP, and the preconfigured uplink BWP includes the PRACH resource. PRACH resources in preconfigured uplink BWP resources may be preconfigured, or the base station may send indication information to the terminal device to indicate PRACH resources in the preconfigured uplink BWP resources. It should be understood that, when the target uplink BWP may be the uplink BWP used for initial access or the preconfigured uplink BWP, the terminal device may be directly triggered, by using the PDCCH signaling, to switch to the target uplink BWP, and the PDCCH signaling does not include an identifier of the uplink BWP.

Example 3: If the PDCCH signaling includes an identifier of the target uplink BWP, in step 402, the terminal device switches to the uplink BWP identified by the identifier of the target uplink BWP. Example 3 may be applied to a scenario in which a plurality of uplink BWPs in uplink BWPs preconfigured for the terminal device include PRACH resources, or may be applied to a scenario in which one uplink BWP in uplink BWPs configured for the terminal device includes a PRACH resource. If the base station configures only one uplink BWP including the PRACH resource for the terminal device, a BWP identifier in signaling may be understood as a predefined value. This is not limited.

Example 1 and example 2 may be separately used in combination with example 3. If example 1 is used in combination with example 3, and the PDCCH signaling does not include the identifier of the target uplink BWP, after receiving the PDCCH signaling, the terminal device switches to the uplink BWP used for initial access. If the PDCCH signaling includes the identifier of the target uplink BWP, after receiving the PDCCH signaling, the terminal device switches to the uplink BWP identified by the identifier of the target uplink BWP.

Step 403: The terminal device sends a preamble sequence to the base station by using the PRACH resource included in the target uplink BWP.

Because it takes some time for the terminal device to perform uplink BWP switching in step 402, to ensure that the base station and the terminal device have sufficient time to process the BWP switching and sending and receiving of the preamble sequence, in step 403, the terminal device may send the preamble sequence to the base station on the PRACH resource included in the target uplink BWP in the following manner.

The terminal device sends the preamble sequence to a network device in a first time unit by using the PRACH resource included in the target uplink BWP, where there is a first time between the first time unit and a second time unit, and the second time unit is a time unit in which the terminal device receives the PDCCH signaling. In the embodiments of this application, the time unit may include an integral quantity of symbols, an integral quantity of slots, an integral quantity of mini-slots, an integral quantity of subframes, an integral quantity of radio frames, or an integral quantity of other time domain units. This is not limited in this application.

It should be noted that the first time may be an absolute time, for example, 5 milliseconds (ms), may be directly indicated by the base station to the terminal device, or may be pre-agreed or preconfigured. This is not limited. In addition, the first time may alternatively be k third time units, where duration of the third time unit is predefined or indicated by the base station to the terminal device, and k is a positive integer. Optionally, k is a positive integer greater than or equal to 20. Specifically, a quantity of the third time units between the second time unit and the first time unit may be indicated by the base station to the terminal device, or may be pre-agreed. This is not limited in the embodiments of this application.

When the first time is k third time units, because the time unit is related to a subcarrier spacing corresponding to a BWP, the first time unit is related to a subcarrier spacing corresponding to the target uplink BWP, and the second time unit is related to a subcarrier spacing corresponding to a downlink BWP for receiving the PDCCH signaling. When the subcarrier spacing corresponding to the target uplink BWP is the same as the subcarrier spacing corresponding to the downlink BWP for receiving the PDCCH signaling, duration of the first time unit is the same as duration of the second time unit. When the subcarrier spacing corresponding to the target uplink BWP is different from the subcarrier spacing corresponding to the downlink BWP for receiving the PDCCH signaling, duration of the first time unit may be different from duration of the second time unit. The third time unit may be duration of the first time unit, or may be duration of the second time unit, or may be duration that can be supported by both the terminal device and the base station and that is different from that of the first time unit and the second time unit. For another example, both the terminal device and the base station support a subcarrier spacing of 15 kHz, and the third time unit may be duration of a time unit corresponding to 15 kHz.

Figure 5:
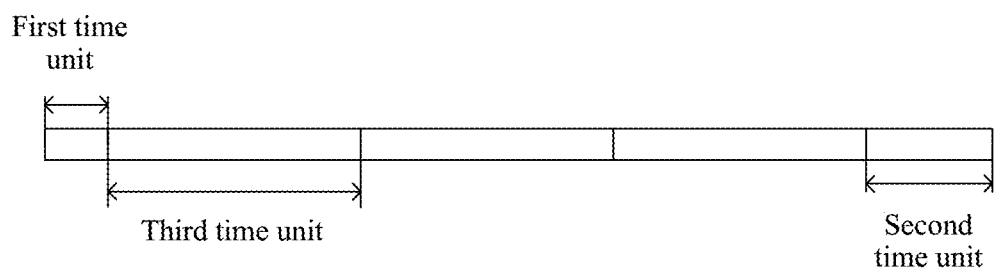
FIG. 5 is a schematic diagram of a relationship between time units according to an embodiment of this application.

As shown in FIG. 5, a value of k is 3. When a subcarrier spacing corresponding to the first time unit is 60 kHz, a subcarrier spacing corresponding to the second time unit is 30 kHz, and a subcarrier spacing corresponding to the third time unit is 15 kHz, there are three third time units between the second time unit and the first time unit.

After receiving the preamble sequence sent by the terminal device, the base station determines TA based on the preamble sequence. A manner of determining the TA based on the preamble sequence is similar to a manner of determining the TA based on the preamble sequence in FIG. 1. Details are not described herein again. Then, a random access response (RAR) is sent to the terminal device, where the RAR includes the TA.

Specifically, when the uplink BWP and the downlink BWP of the terminal device are configured in a pair, the terminal device sends the preamble sequence on the target uplink BWP. The base station needs to switch to the downlink BWP that is configured in a pair with the target uplink BWP, and send the RAR on the downlink BWP that is configured in a pair with the target uplink BWP. After receiving the RAR, the terminal device completes the uplink synchronization. Therefore, when the terminal device sends the uplink information to the base station based on the TA included in the RAR, the base station can receive the uplink information sent by the terminal device, to complete normal communication between the base station and the terminal device.

It should be noted that, that the uplink BWP and the downlink BWP are configured in a pair means that when the terminal device sends uplink information on the uplink BWP, the base station sends downlink information to the terminal device on the downlink BWP that is configured in a pair with the uplink BWP; and when the uplink BWP or the downlink BWP is activated, a downlink BWP configured in pair with the uplink BWP or an uplink BWP configured in pair with the downlink BWP is also activated.

When the uplink BWP and the downlink BWP of the terminal device are not configured in a pair, the base station may send the RAR to the terminal device on the currently activated downlink BWP.

It should be understood that the currently activated downlink BWP refers to a frequency domain resource that is currently used by the base station to send the downlink information to the terminal device.

In addition, to avoid being out-of-synchronization with the base station in the uplink direction, optionally, the terminal device may send the preamble sequence to the base station periodically or on an event-triggered basis after initial access. For example, after the terminal device sends the uplink information to the base station, if response information sent by the base station is not received in a specific time period, the terminal device triggers sending the preamble sequence to the base station. However, there may be a plurality of terminal devices within coverage of the base station, and an allocated PRACH resource is shared by all terminal devices. To enable the base station to distinguish between preamble sequences sent by different terminal devices, a embodiment of this application provides several optional technical solutions. The following uses an example in which execution bodies are a base station and a terminal device for description. In the embodiments of this application, an apparatus implementing a function of a terminal may be a terminal, or may be an apparatus supporting the terminal in implementing the function; and an apparatus implementing a function of a network device may be a network device, or may be an apparatus supporting the network device in implementing the function. For example, the execution bodies in the embodiments of this application may alternatively be a chip in the base station and a chip in the terminal device.

Figure 6:
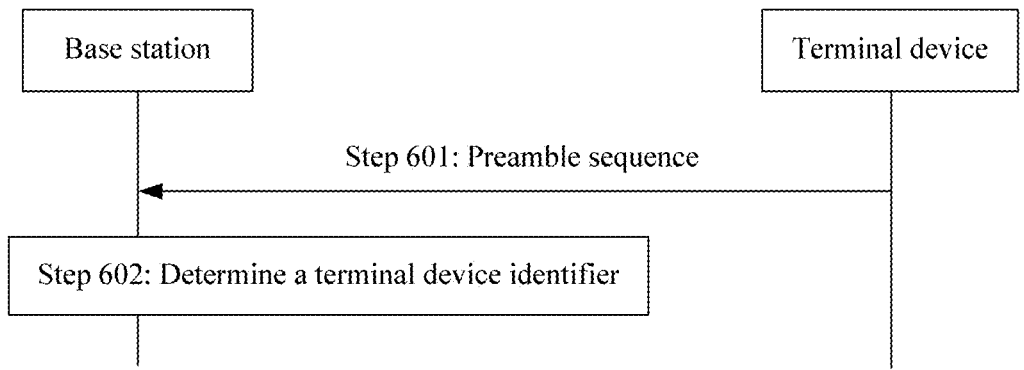
FIG. 6 is a schematic flowchart of an access method according to an embodiment of this application.

Solution 1:

As shown in FIG. 6, an access method in a embodiment of this application includes the following steps.

Step 601: The terminal device sends a preamble sequence to the base station, where the preamble sequence may be used to determine a terminal device identifier, and the terminal device identifier is used to identify a terminal device that sends the preamble sequence, such as a cell-radio network temporary identifier (C-RNTI).

Optionally, if the preamble sequence carries the terminal device identifier, the base station determines, after receiving the preamble sequence, a terminal device that the preamble sequence is from. There are two cases in which the preamble sequence carries the terminal device identifier: Case 1: The preamble sequence includes the terminal device identifier; and case 2: The preamble sequence is a sequence scrambled by using the terminal device identifier.

In another optional solution, the preamble sequence sent by the terminal device to the base station is a preamble sequence in a preamble sequence set corresponding to the terminal device identifier. The preamble sequence set corresponding to the terminal device identifier may be a preamble sequence set that is configured by the base station for the terminal device, or may be a preconfigured preamble sequence set. This is not limited in this application. For example, the base station configures different preamble sequence sets for different terminal devices within the coverage, and preamble sequences included in different preamble sequence sets are different. For example, a preamble sequence set 1 is {preamble sequence 1, preamble sequence 2}, and a preamble sequence set 2 is {preamble sequence 3, preamble sequence 4}. The preamble sequence set 1 corresponds to a terminal device identifier 1, and the preamble sequence set 2 corresponds to a terminal device identifier 2. Preamble sequence 1, preamble sequence 2, preamble sequence 3, and preamble sequence 4 are different. In this case, a terminal device identified by the terminal device identifier 1 can select only one preamble sequence from the preamble sequence 1 and the preamble sequence 2, and send the selected preamble sequence to the base station. A terminal device identified by the terminal device identifier 2 can select only one preamble sequence from the preamble sequence 3 and the preamble sequence 4, and send the selected preamble sequence to the base station. Therefore, because the preamble sequence is configured for the terminal device, the base station may determine, after receiving the preamble sequence, a terminal device that the preamble sequence is from.

Step 602: After receiving the preamble sequence sent by the terminal device, the base station determines the terminal device identifier based on the preamble sequence.

Figure 7:
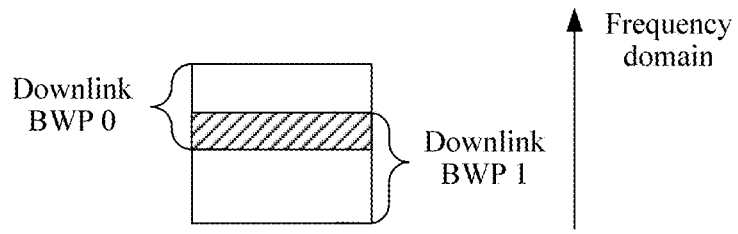
FIG. 7 is a schematic diagram of a PRACH resource according to an embodiment of this application.

It should be understood that solution 1 of this embodiment of this application may be applied to a scenario in which downlink BWPs configured by the base station for the plurality of terminal devices within a coverage cover a same PRACH resource. For example, as shown in FIG. 7, an overlapping part between a downlink BWP 0 and a downlink BWP 1 is a PRACH resource, and the base station configures a downlink BWP 1 for a terminal device 1, and configures a downlink BWP 0 for a terminal device 2.

Figure 8:
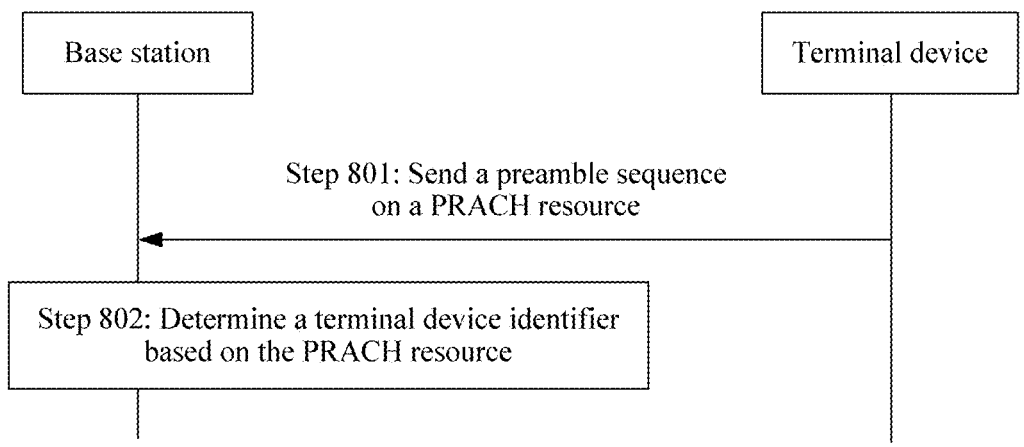
FIG. 8 is a schematic flowchart of an access method according to an embodiment of this application.

Solution 2:

As shown in FIG. 8, an access method in a embodiment of this application includes the following steps.

Step 801: The terminal device sends a preamble sequence on a PRACH resource, where the PRACH resource corresponds to the terminal device, and the terminal device is a terminal device that sends the preamble sequence.

It should be noted that, that the PRACH resource corresponds to the terminal device means that the PRACH resource is configured for the terminal device. For example, PRACH resources configured for different terminal devices may be different. In specific implementation, the PRACH resource may be associated with the terminal device identifier.

Step 802: After receiving, on the PRACH resource, the preamble sequence sent by the terminal device, the base station determines the terminal device based on the PRACH resource.

It should be understood that in the access method shown in FIG. 8 in this application, the PRACH resource is a PRACH resource in frequency domain, and may be referred to as a PRACH frequency domain resource for short.

Figure 9:
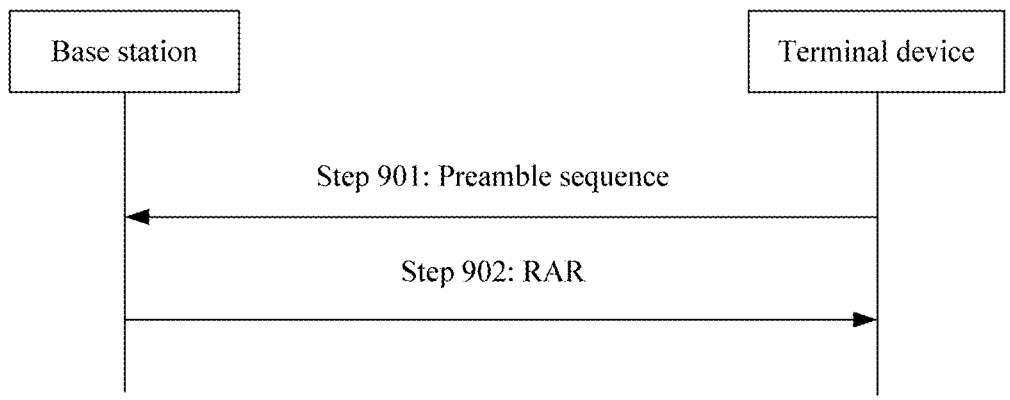
FIG. 9 is a schematic flowchart of an access method according to an embodiment of this application.

Solution 3:

As shown in FIG. 9, an access method in a embodiment of this application includes the following steps.

Step 901: The terminal device sends a preamble sequence on a PRACH resource, where the PRACH resource corresponds to a first uplink BWP and a second uplink BWP.

Step 902: After receiving, on the PRACH resource, the preamble sequence sent by the terminal device, the base station sends an RAR on each of a first downlink BWP and a second downlink BWP, where the RAR includes a response corresponding to the preamble sequence, the first uplink BWP corresponds to the first downlink BWP, and the second uplink BWP corresponds to the second downlink BWP.

It should be understood that the embodiment in FIG. 9 may be further extended to a case of more BWPs. For example, in step 901, the PRACH resource corresponds to the first uplink BWP, the second uplink BWP, and a third uplink BWP. In step 902, the base station sends the RAR on each of the first downlink BWP, the second downlink BWP, and a third downlink BWP, where the RAR includes a response corresponding to the preamble sequence, the first uplink BWP corresponds to the first downlink BWP, the second uplink BWP corresponds to the second downlink BWP, and the third uplink BWP corresponds to the third downlink BWP.

It should be understood that solution 3 in this embodiment of this application may be applied to a scenario in which downlink BWPs configured by the base station for the plurality of terminal devices within a coverage cover a same PRACH resource. In this scenario, after receiving the preamble sequence sent by the terminal device, the base station cannot identify a terminal device that the preamble sequence is from. Then, the base station sends the RAR on a downlink BWP corresponding to a possible terminal device within the coverage, where the RAR includes a response corresponding to the preamble sequence. For example, the coverage area of the base station includes a terminal device 1, a terminal device 2, and a terminal device 3. If the terminal device 1 sends a preamble sequence 1 to the base station, and the terminal device 2 sends a preamble sequence 2 to the base station, but the terminal device 3 sends no preamble sequence, after receiving the preamble sequence 1 and the preamble sequence 2, and if the preamble sequence 1 is different from the preamble sequence 2, the base station separately responds to the preamble sequence 1 and the preamble sequence 2 to obtain an RAR, where the RAR includes a response corresponding to the preamble sequence 1 and a response corresponding to the preamble sequence 2. Because the base station cannot identify a terminal device that the preamble sequence 1 and the preamble sequence 2 are from, the base station separately sends the RAR on a downlink BWP 1, a downlink BWP 2, and a downlink BWP 3. The downlink BWP 1 corresponds to an uplink BWP corresponding to the terminal device 1 that sends the preamble sequence 1, the downlink BWP 2 corresponds to an uplink BWP corresponding to the terminal device 2 that sends the preamble sequence 2, and the downlink BWP 3 corresponds to an uplink BWP currently activated by the terminal device 3. Therefore, in the foregoing manner, the terminal device 1 and the terminal device 2 can receive the RAR sent by the base station, to implement uplink synchronization.

If the preamble sequence 1 and the preamble sequence 2 are the same, in this case, the base station responds to the preamble sequence only once, to obtain a response that corresponds to only one preamble sequence in the RAR. A manner in which the base station sends the RAR may be similar to a manner in which the base station sends the RAR when the preamble sequence 1 is different from the preamble sequence 2. Details are not described herein again. After receiving the RAR, the terminal device 1 and the terminal device 2 implement uplink synchronization adjustment based on TA in the RAR.

Optionally, the base station and the terminal device may maintain a same timer, or the base station and the terminal device each maintain a timer. After the timer expires, the base station and the terminal device consider that the terminal device is out-of-synchronization in an uplink direction, and it may be predefined that the terminal device switches to an initial access uplink BWP for sending the preamble sequence. For asymmetric spectrums, the base station switches to the initial access downlink BWP for sending the RAR; or for the asymmetric spectrums, the base station may send the RAR on a currently activated downlink BWP. A start condition of the timer of the terminal device may be that the terminal device sends uplink control information, uplink data information, or an uplink sounding reference signal. A start condition of the timer of the base station may be that the base station sends downlink control information, downlink data information, a channel state information-reference signal, or a tracking reference signal. Duration of the timer on the base station side and duration of the timer on the terminal device side may be predefined. Optionally, the base station side sends physical layer signaling or higher layer information to the terminal device; and after receiving the physical layer signaling or the higher layer information, the terminal device initiates a random access process.

In the foregoing embodiments provided in this application, the methods provided in the embodiments of this application are described from perspectives of the base station, the terminal device, and the interaction between the base station and the terminal device. To implement the functions in the foregoing methods provided in the embodiments of this application, the base station or the terminal device may include a hardware structure and/or a software module, and implement the foregoing functions in a form of the hardware structure, the software module, or a combination of the hardware structure and the software module. Whether a function in the foregoing functions is performed by the hardware structure, the software module, or a combination of the hardware structure and the software module depends on particular applications and design constraints of the technical solutions.

Figure 10:
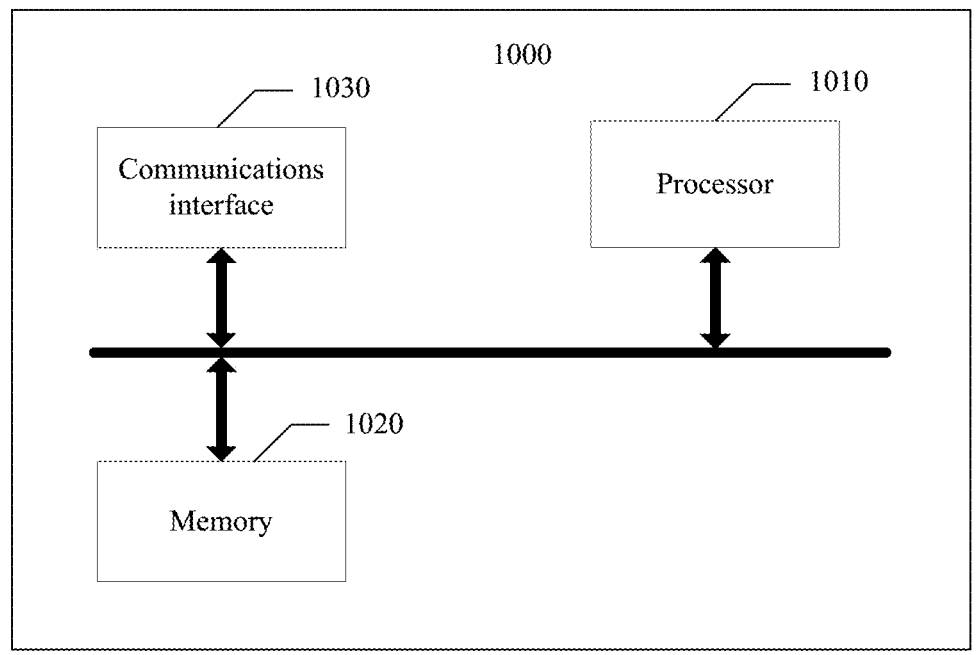
FIG. 10 is a schematic diagram of an apparatus according to an embodiment of this application.

Based on a same concept, FIG. 10 shows an apparatus 1000 provided in this application. The apparatus 1000 may be a terminal device, or may be an apparatus that can support the terminal device in implementing a function of the terminal device in the method in FIG. 4. For example, the apparatus 1000 may be an apparatus (such as a chip or a chip system) in the terminal device. It should be noted that in the embodiments of this application, the chip system may include a chip, or may include a chip and another discrete device.

The apparatus 1000 includes at least one processor 1010, configured to implement a function of the terminal device in the resource configuration method provided in the embodiments of this application.

The apparatus 1000 may further include at least one memory 1020, configured to store a program instruction and/or data. The memory 1020 is coupled to the processor 1010. Couplings in the embodiments of this application are indirect couplings or communication connections between apparatuses, units, or modules, may be implemented in electrical, mechanical, or other forms, and are used for information exchange between the apparatuses, the units, or the modules. The processor 1010 may cooperate with the memory 1020. The processor 1010 may execute the program instruction stored in the memory 1020. At least one of the at least one memory 1020 may be included in the processor 1010.

The apparatus 1000 may further include a communications interface 1030, and the apparatus 1000 may exchange information with another device by using the communications interface 1030. The communications interface 1030 may be a circuit, a bus, a transceiver, or any other apparatus that may be configured to perform information exchange. For example, the another device may be another terminal device or a network device. The processor 1010 may send and receive data by using the communications interface 1030. For example, the communications interface 1030 is configured to receive PDCCH signaling, where the PDCCH signaling is used to trigger a random access procedure.

In this embodiment of this application, a specific connection medium between the communications interface 1030, the processor 1010, and the memory 1020 is not limited. In this embodiment of this application, the memory 1020, the processor 1010, and the communications interface 1030 are connected by using a bus in FIG. 10. In FIG. 10, the bus is represented by a thick line. The foregoing is merely an example for description. Connection modes of other components are not limited thereto. The bus may be classified into an address bus, a data bus, a control bus, and the like. For ease of representation, only one thick line is used to represent the bus in FIG. 10, but this does not mean that there is only one bus or only one type of bus.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams that are disclosed in the embodiments of this application. The general-purpose processor may be a microprocessor, or any conventional processor, or the like. The steps of the method disclosed with reference to the embodiments of this application may be directly performed by a hardware processor, or may be performed by using a combination of hardware in the processor and a software module.

In the embodiments of this application, the memory may be a non-volatile memory such as a hard disk drive (HDD) or a solid-state drive (SSD), or may be a volatile memory such as a random-access memory (RAM). The memory may alternatively be any other medium that can be configured to carry or store expected program code in a form of an instruction or a data structure and that can be accessed by a computer, but is not limited thereto. The memory in the embodiments of this application may alternatively be a circuit or any other apparatus that can implement a storage function, and is configured to store a program instruction and/or data.

Figure 11:
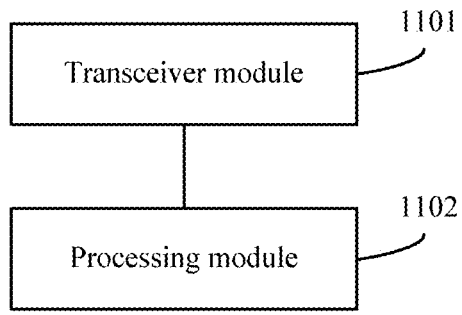
FIG. 11 is a schematic diagram of an apparatus according to an embodiment of this application.

FIG. 11 shows another embodiment of an apparatus provided in this application. The apparatus may be a terminal device, or may be an apparatus that can support the terminal device in implementing a function of the terminal device in the method in FIG. 4. For example, the apparatus may be an apparatus (such as a chip or a chip system) in the terminal device.

The apparatus includes a transceiver module 1101 and a processing module 1102. The transceiver module 1101 is configured to receive PDCCH signaling, where the PDCCH signaling is used to trigger a random access procedure. The processing module 1102 is configured to switch to a target uplink BWP, where the target uplink BWP includes a PRACH resource. The transceiver module 1101 is further configured to send a preamble sequence by using a PRACH resource included in the target uplink BWP.

In a possible design, the target uplink BWP is an uplink BWP used for initial random access; or the target uplink BWP is a preconfigured uplink BWP, and the preconfigured uplink BWP includes the PRACH resource.

In a possible design, the PDCCH signaling includes an identifier of the target uplink BWP.

In a possible design, the transceiver module 1101 is specifically configured to send the preamble sequence in a first time unit by using the PRACH resource included in the target uplink BWP. There is a first time between the first time unit and a second time unit, and the second time unit is a time unit in which the PDCCH signaling is received.

In a possible design, the first time is an absolute time, or the first time is k third time units, duration of the third time unit is predefined, and k is a positive integer.

In a possible design, a subcarrier spacing corresponding to the first time unit is a subcarrier spacing of a downlink BWP used to send the PDCCH signaling, and a subcarrier spacing corresponding to the second time unit is a subcarrier spacing corresponding to the target uplink BWP.

In a possible design, the transceiver module 1101 is further configured to receive uplink timing advance TA, and the processing module 1102 is further configured to send data based on the TA.

It should be understood that the apparatus may be configured to implement steps performed by the terminal device in the resource configuration method in the embodiments of this application. For related features, refer to the foregoing descriptions. Details are not described herein again.

Figure 12:
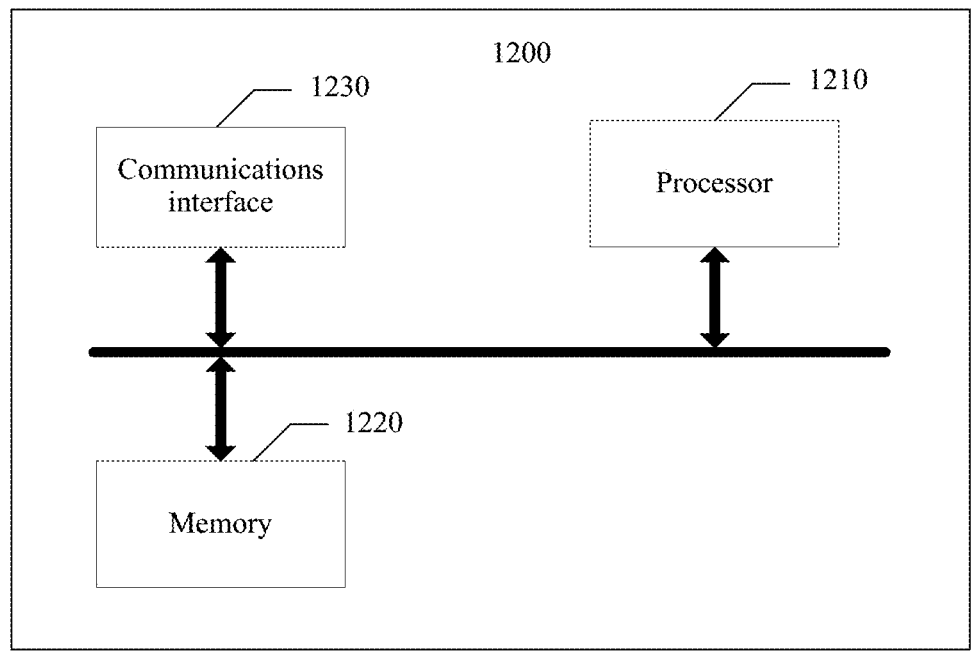
FIG. 12 is a schematic diagram of an apparatus according to an embodiment of this application.

Based on a same concept, FIG. 12 shows an apparatus 1200 provided in this application. The apparatus 1200 may be a network device, or may be an apparatus that can support the network device in implementing a function of the network device in the method in FIG. 4. For example, the apparatus 1200 may be an apparatus (such as a chip or a chip system) in the network device. It should be noted that in the embodiments of this application, the chip system may include a chip, or may include a chip and another discrete device.

The apparatus 1200 includes at least one processor 1210, configured to implement a function of the base station in the resource configuration method provided in the embodiments of this application. The apparatus 1200 may further include at least one memory 1220, configured to store a program instruction and/or data. The memory 1220 is coupled to the processor 1210. The processor 1210 may cooperate with the memory 1220. The processor 1210 may execute the program instruction stored in the memory 1220. At least one of the at least one memory 1220 may be included in the processor 1210.

The apparatus 1200 may further include a communications interface 1230, and the apparatus 1200 may exchange information with another device by using the communications interface 1230. The communications interface 1230 may be a circuit, a bus, a transceiver, or any other apparatus that may be configured to perform information exchange. For example, the another device may be another terminal device or a network device. The processor 1210 may send and receive data by using the communications interface 1230. For example, the communications interface 1230 is configured to send PDCCH signaling, where the PDCCH signaling is used to trigger a random access procedure.

In this embodiment of this application, a specific connection medium between the communications interface 1230, the processor 1210, and the memory 1220 is not limited. In this embodiment of this application, the memory 1220, the processor 1210, and the communications interface 1230 are connected by using a bus in FIG. 12. In FIG. 12, the bus is represented by a thick line. The foregoing is merely an example for description. Connection modes of other components are not limited thereto. The bus may be classified into an address bus, a data bus, a control bus, and the like. For ease of representation, only one thick line is used to represent the bus in FIG. 12, but this does not mean that there is only one bus or only one type of bus.

Figure 13:
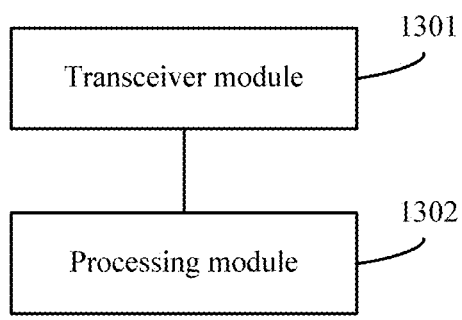
FIG. 13 is a schematic diagram of an apparatus according to an embodiment of this application.

FIG. 13 shows another embodiment of an apparatus provided in this application. The apparatus may be a network device, or may be an apparatus that can support the network device in implementing a function of the network device in the method in FIG. 4. For example, the apparatus may be an apparatus (such as a chip or a chip system) in the network device, and can perform the foregoing method performed by a base station in any embodiment shown in FIG. 4.

The apparatus includes a transceiver module 1301 and a processing module 1302. The processing module 1302 is configured to trigger the transceiver module 1301. The transceiver module 1301 is configured to send PDCCH signaling and receive a preamble sequence on a PRACH resource included in a target uplink BWP, where the PDCCH signaling is used to trigger a random access procedure.

In a possible design, the target uplink BWP is an uplink BWP used for initial random access; or the target uplink BWP is a preconfigured uplink BWP, and the preconfigured uplink BWP includes the PRACH resource.

In a possible design, the PDCCH signaling includes an identifier of the target uplink BWP.

In a possible design, the processing module 1302 is configured to determine TA based on the preamble sequence, and the transceiver module 1301 is further configured to send the TA on a target downlink BWP.

It should be understood that the apparatus may be configured to implement steps performed by the network device in the resource configuration method in the embodiments of this application. For related features, refer to the foregoing descriptions. Details are not described herein again.

Figure 14:
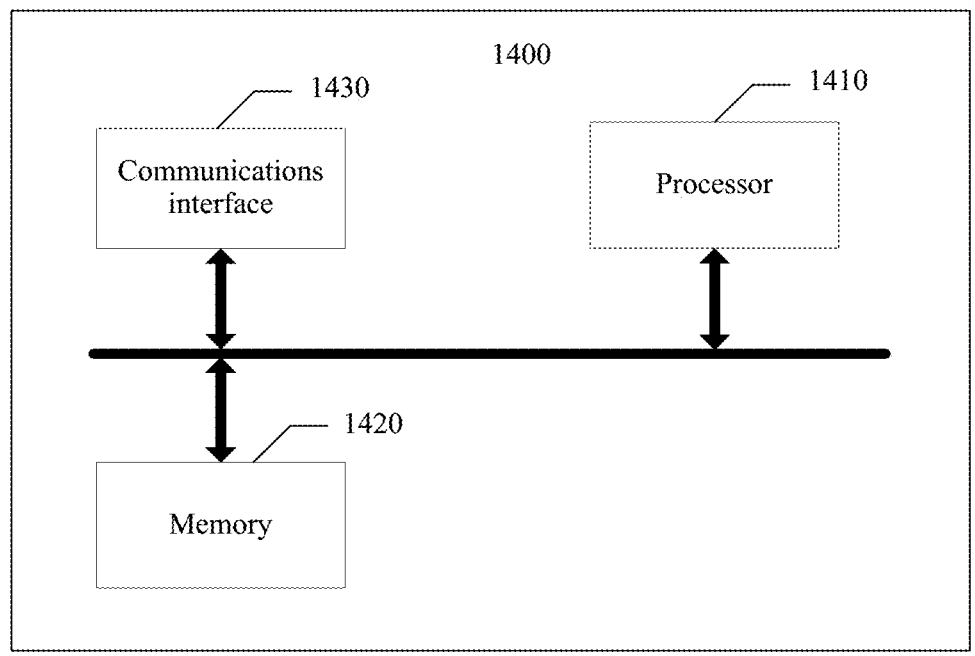
FIG. 14 is a schematic diagram of an apparatus according to an embodiment of this application.

Based on a same concept, FIG. 14 shows an apparatus 1400 provided in this application. The apparatus 1400 may be a terminal device, or may be an apparatus that can support the terminal device in implementing a function of the terminal device in the method in FIG. 6. For example, the apparatus 1400 may be an apparatus (such as a chip or a chip system) in the terminal device. It should be noted that in the embodiments of this application, the chip system may include a chip, or may include a chip and another discrete device.

The apparatus 1400 includes at least one processor 1410, configured to implement a function of the terminal device in the access method provided in the embodiments of this application. The apparatus 1400 may further include at least one memory 1420, configured to store a program instruction and/or data. The memory 1420 is coupled to the processor 1410. The processor 1410 may cooperate with the memory 1420. The processor 1410 may execute the program instruction stored in the memory 1420. At least one of the at least one memory 1420 may be included in the processor 1410.

The apparatus 1400 may further include a communications interface 1430, and the apparatus 1400 may exchange information with another device by using the communications interface 1430. The communications interface 1430 may be a circuit, a bus, a transceiver, or any other apparatus that may be configured to perform information exchange. For example, the another device may be another terminal device or a network device. The processor 1410 may send and receive data by using the communications interface 1430. For example, the communications interface 1430 is configured to send a preamble sequence, where the preamble sequence is used to determine a terminal device identifier, and the terminal device identifier is used to identify a terminal device that sends the preamble sequence.

In this embodiment of this application, a specific connection medium between the communications interface 1430, the processor 1410, and the memory 1420 is not limited. In this embodiment of this application, the memory 1420, the processor 1410, and the communications interface 1430 are connected by using a bus in FIG. 14. In FIG. 14, the bus is represented by a thick line. The foregoing is merely an example for description. Connection modes of other components are not limited thereto. The bus may be classified into an address bus, a data bus, a control bus, and the like. For ease of representation, only one thick line is used to represent the bus in FIG. 14, but this does not mean that there is only one bus or only one type of bus.

Figure 15:
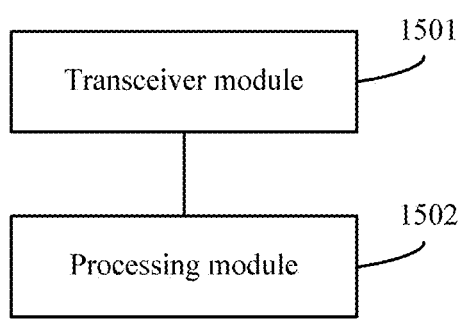
FIG. 15 is a schematic diagram of an apparatus according to an embodiment of this application.

FIG. 15 shows another embodiment of an apparatus provided in this application. The apparatus may be a terminal device, or may be an apparatus that can support the terminal device in implementing a function of the terminal device in the method in FIG. 6. For example, the apparatus may be an apparatus (such as a chip or a chip system) in the terminal device.

The apparatus includes a transceiver module 1501 and a processing module 1502. The processing module 1502 is configured to trigger the transceiver module 1501. The transceiver module 1501 is configured to send a preamble sequence, where the preamble sequence is used to determine a terminal device identifier, and the terminal device identifier is used to identify a terminal device that sends the preamble sequence.

In a possible design, the preamble sequence carries the terminal device identifier.

In a possible design, a possible implementation in which the preamble sequence carries the terminal device identifier is that the preamble sequence is a sequence scrambled by using the terminal device identifier.

In a possible design, the preamble sequence is a preamble sequence in a preamble sequence set corresponding to the terminal device identifier.

It should be understood that the apparatus may be configured to implement steps performed by the terminal device in the resource configuration method in the embodiments of this application. For related features, refer to the foregoing descriptions. Details are not described herein again.

Figure 16:
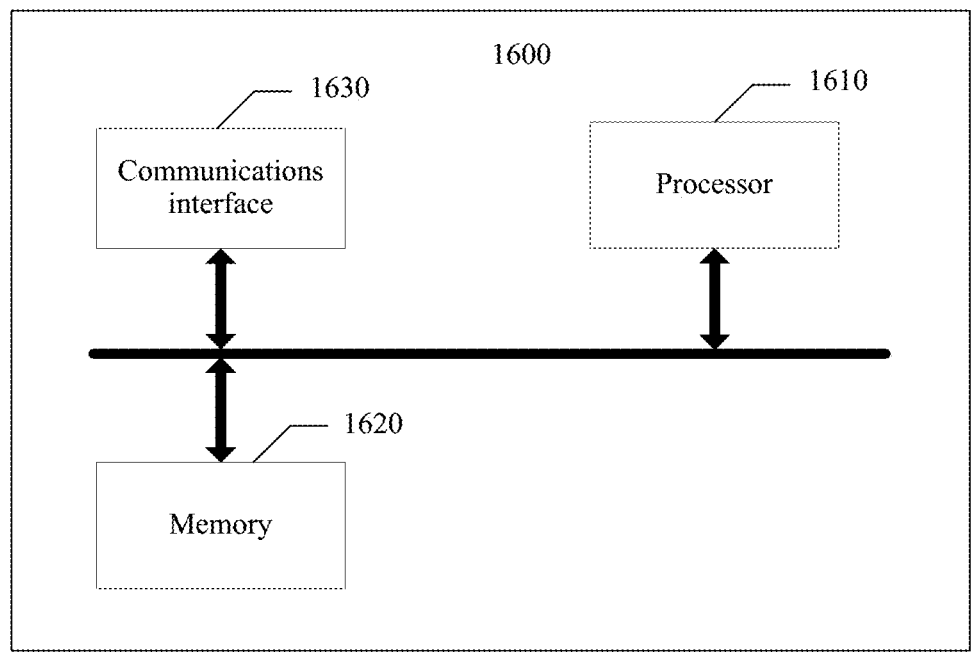
FIG. 16 is a schematic diagram of an apparatus according to an embodiment of this application.

Based on a same concept, FIG. 16 shows an apparatus 1600 provided in this application. The apparatus 1600 may be a network device, or may be an apparatus that can support the network device in implementing a function of the network device in the method in FIG. 6. For example, the apparatus 1600 may be an apparatus (such as a chip or a chip system) in the network device. It should be noted that, in the embodiments of this application, the chip system may include a chip, or may include a chip and another discrete device.

The apparatus 1600 includes at least one processor 1610, configured to implement a function of the base station in the access method provided in the embodiments of this application. The apparatus 1600 may further include at least one memory 1620, configured to store a program instruction and/or data. The memory 1620 is coupled to the processor 1610. The processor 1610 may cooperate with the memory 1620. The processor 1610 may execute the program instruction stored in the memory 1620. At least one of the at least one memory 1620 may be included in the processor 1610.

The apparatus 1600 may further include a communications interface 1630, and the apparatus 1600 may exchange information with another device by using the communications interface 1630. The communications interface 1630 may be a circuit, a bus, a transceiver, or any other apparatus that may be configured to perform information exchange. For example, the another device may be another terminal device or a network device. The processor 1610 receives and sends data by using the communications interface 1630. For example, the communications interface 1630 is configured to receive a preamble sequence, and the processor 1610 is configured to determine a terminal device identifier based on the preamble sequence. The terminal device identifier is used to identify a terminal device that sends the preamble sequence.

In this embodiment of this application, a specific connection medium between the communications interface 1630, the processor 1610, and the memory 1620 is not limited. In this embodiment of this application, the memory 1620, the processor 1610, and the communications interface 1630 are connected by using a bus in FIG. 16. In FIG. 16, the bus is represented by a thick line. The foregoing is merely an example for description. Connection modes of other components are not limited thereto. The bus may be classified into an address bus, a data bus, a control bus, and the like. For ease of representation, only one thick line is used to represent the bus in FIG. 16, but this does not mean that there is only one bus or only one type of bus.

Figure 17:
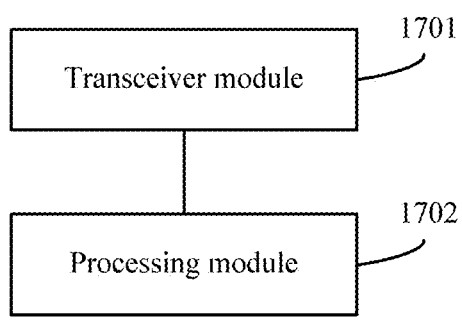
FIG. 17 is a schematic diagram of an apparatus according to an embodiment of this application.

FIG. 17 shows another embodiment of an apparatus provided in this application. The apparatus may be a network device, or may be an apparatus that can support the network device in implementing a function of the network device in the method in FIG. 6. For example, the apparatus may be an apparatus (such as a chip or a chip system) in the network device.

The apparatus includes a transceiver module 1701 and a processing module 1702. The transceiver module 1701 is configured to receive a preamble sequence. The processing module 1702 is configured to determine a terminal device identifier based on the preamble sequence. The terminal device identifier is used to identify a terminal device that sends the preamble sequence.

In a possible design, the preamble sequence carries the terminal device identifier.

In a possible design, a possible implementation in which the preamble sequence carries the terminal device identifier is that the preamble sequence is a sequence scrambled by using the terminal device identifier.

In a possible design, the preamble sequence is a preamble sequence in a preamble sequence set corresponding to the terminal device identifier.

It should be understood that the apparatus may be configured to implement steps performed by the network device in the resource configuration method in the embodiments of this application. For related features, refer to the foregoing descriptions. Details are not described herein again.

Figure 18:
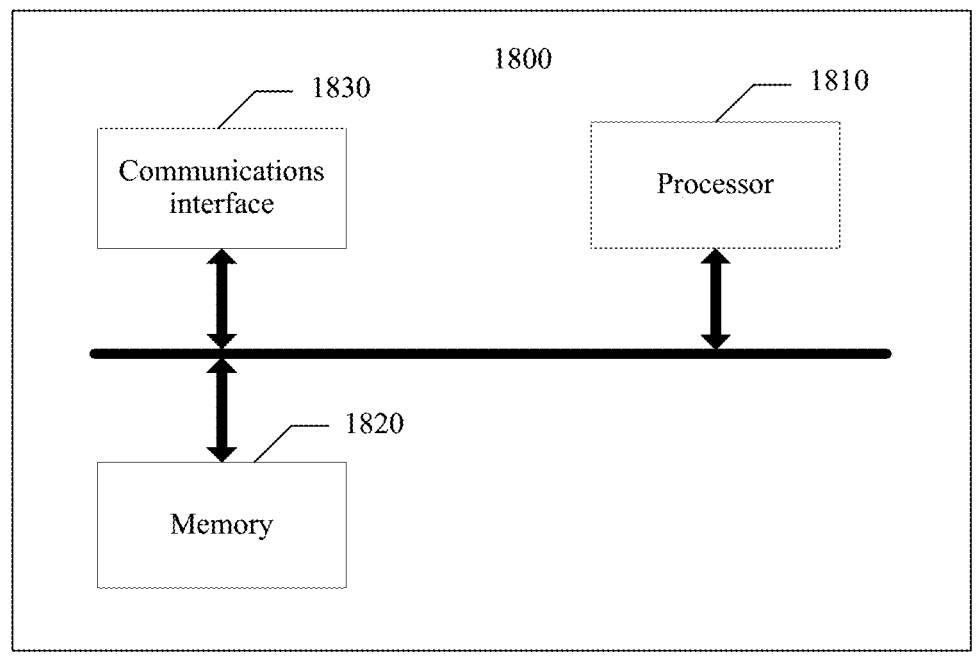
FIG. 18 is a schematic diagram of an apparatus according to an embodiment of this application.

Based on a same concept, FIG. 18 shows an apparatus 1800 provided in this application. The apparatus 1800 may be a terminal device, or may be an apparatus that can support the terminal device in implementing a function of the terminal device in the method in FIG. 8. For example, the apparatus 1800 may be an apparatus (such as a chip or a chip system) in the terminal device. It should be noted that in the embodiments of this application, the chip system may include a chip, or may include a chip and another discrete device.

The apparatus 1800 includes at least one processor 1810, configured to implement a function of the terminal device in the access method provided in the embodiments of this application. The apparatus 1800 may further include at least one memory 1820, configured to store a program instruction and/or data. The memory 1820 is coupled to the processor 1810. The processor 1810 may cooperate with the memory 1820. The processor 1810 may execute the program instruction stored in the memory 1820. At least one of the at least one memory 1820 may be included in the processor 1810.

The apparatus 1800 may further include a communications interface 1830, and the apparatus 1800 may exchange information with another device by using the communications interface 1830. The communications interface 1830 may be a circuit, a bus, a transceiver, or any other apparatus that may be configured to perform information exchange. For example, the another device may be another terminal device or a network device. The processor 1810 may send and receive data by using the communications interface 1830. For example, the communications interface 1830 is configured to send a preamble sequence on a PRACH resource, where the PRACH resource corresponds to the terminal device, and the terminal device is a terminal device that sends the preamble sequence.

In this embodiment of this application, a specific connection medium between the communications interface 1830, the processor 1810, and the memory 1820 is not limited. In this embodiment of this application, the memory 1820, the processor 1810, and the communications interface 1830 are connected by using a bus in FIG. 18. In FIG. 18, the bus is represented by a thick line. The foregoing is merely an example for description. Connection modes of other components are not limited thereto. The bus may be classified into an address bus, a data bus, a control bus, and the like. For ease of representation, only one thick line is used to represent the bus in FIG. 18, but this does not mean that there is only one bus or only one type of bus.

Figure 19:
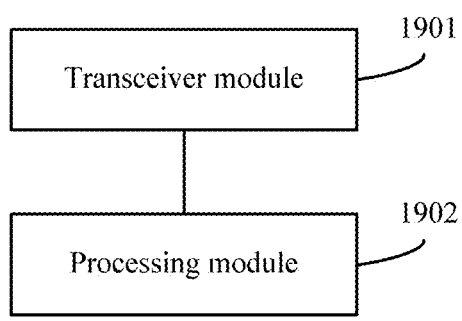
FIG. 19 is a schematic diagram of an apparatus according to an embodiment of this application.

FIG. 19 shows another embodiment of an apparatus provided in this application. The apparatus may be a network device, or may be an apparatus that can support the network device in implementing a function of the network device in the method in FIG. 8. For example, the apparatus may be an apparatus (such as a chip or a chip system) in a terminal device.

The apparatus includes a transceiver module 1901 and a processing module 1902. The processing module 1902 is configured to trigger the transceiver module 1901, and the transceiver module 1901 is configured to send a preamble sequence on a PRACH resource, where the PRACH resource corresponds to a terminal device, and the terminal device is a terminal device that sends the preamble sequence.

In a possible design, a possible implementation in which the PRACH resource corresponds to the terminal device is that the PRACH resource corresponds to a terminal device identifier.

It should be understood that the apparatus may be configured to implement steps performed by the terminal device in the resource configuration method in the embodiments of this application. For related features, refer to the foregoing descriptions. Details are not described herein again.

Figure 20:
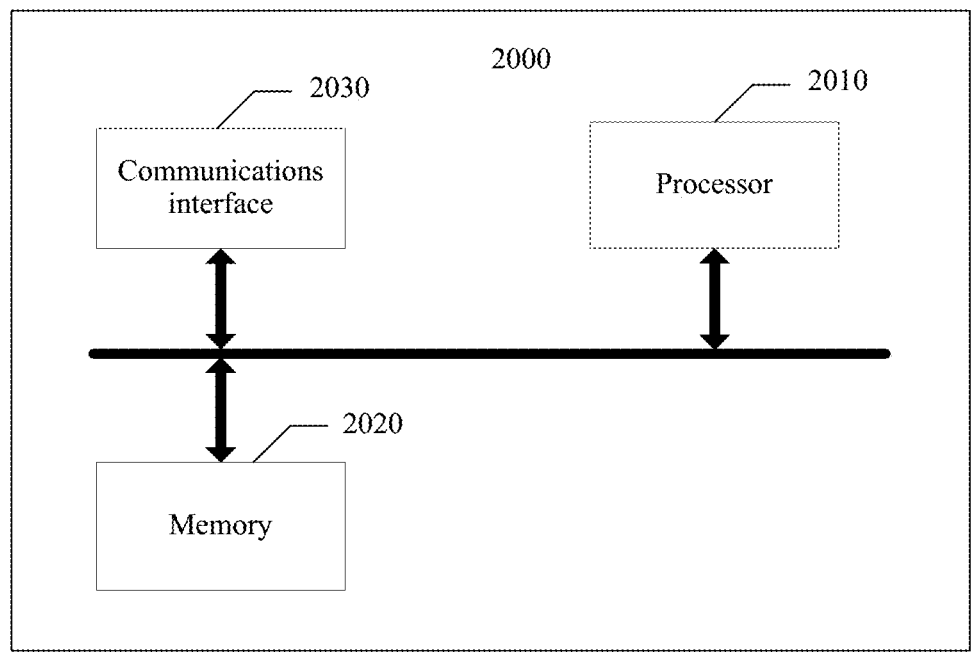
FIG. 20 is a schematic diagram of an apparatus according to an embodiment of this application.

Based on a same concept, FIG. 20 shows an apparatus 2000 provided in this application. The apparatus 2000 may be a network device, or may be an apparatus that can support the network device in implementing a function of the network device in the method in FIG. 8. For example, the apparatus 2000 may also be an apparatus (such as a chip or a chip system) in the network device. It should be noted that, in the embodiments of this application, the chip system may include a chip, or may include a chip and another discrete device.

The apparatus 2000 includes at least one processor 2010, configured to implement a function of the base station in the access method provided in the embodiments of this application. The apparatus 2000 may further include at least one memory 2020, configured to store a program instruction and/or data. The memory 2020 is coupled to the processor 2010. The processor 2010 may cooperate with the memory 2020. The processor 2010 may execute the program instruction stored in the memory 2020. At least one of the at least one memory 2020 may be included in the processor 2010.

The apparatus 2000 may further include a communications interface 2030, and the apparatus 2000 may exchange information with another device by using the communications interface 2030. The communications interface 2030 may be a circuit, a bus, a transceiver, or any other apparatus that may be configured to perform information exchange. For example, the another device may be another terminal device or a network device. The processor 2010 may send and receive data by using the communications interface 2030. For example, the communications interface 2030 is configured to receive a preamble sequence on a PRACH resource, and the processor 2010 is configured to determine a terminal device based on the PRACH resource. The PRACH resource corresponds to a terminal device, and the terminal device is a terminal device that sends the preamble sequence.

In this embodiment of this application, a specific connection medium between the communications interface 2030, the processor 2010, and the memory 2020 is not limited. In this embodiment of this application, the memory 2020, the processor 2010, and the communications interface 2030 are connected by using a bus in FIG. 20. In FIG. 20, the bus is represented by a thick line. The foregoing is merely an example for description. Connection modes of other components are not limited thereto. The bus may be classified into an address bus, a data bus, a control bus, and the like. For ease of representation, only one thick line is used to represent the bus in FIG. 20, but this does not mean that there is only one bus or only one type of bus.

Figure 21:
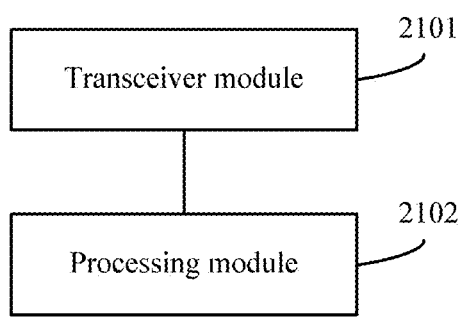
FIG. 21 is a schematic diagram of an apparatus according to an embodiment of this application.

FIG. 21 shows another embodiment of an apparatus provided in this application. The apparatus may be a network device, or may be an apparatus that can support the network device in implementing a function of the network device in the method in FIG. 8. For example, the apparatus may be a network device or may be an apparatus (such as a chip or a chip system) in the network device.

The apparatus includes a transceiver module 2101 and a processing module 2102. The transceiver module 2101 is configured to receive a preamble sequence on a PRACH resource. The processing module 2102 is configured to determine a terminal device based on the PRACH resource. The PRACH resource corresponds to the terminal device, and the terminal device is a terminal device that sends the preamble sequence.

In a possible design, a possible implementation in which the PRACH resource corresponds to the terminal device is that the PRACH resource corresponds to a terminal device identifier.

It should be understood that the apparatus may be configured to implement steps performed by the network device in the resource configuration method in the embodiments of this application. For related features, refer to the foregoing descriptions. Details are not described herein again.

Figure 22:
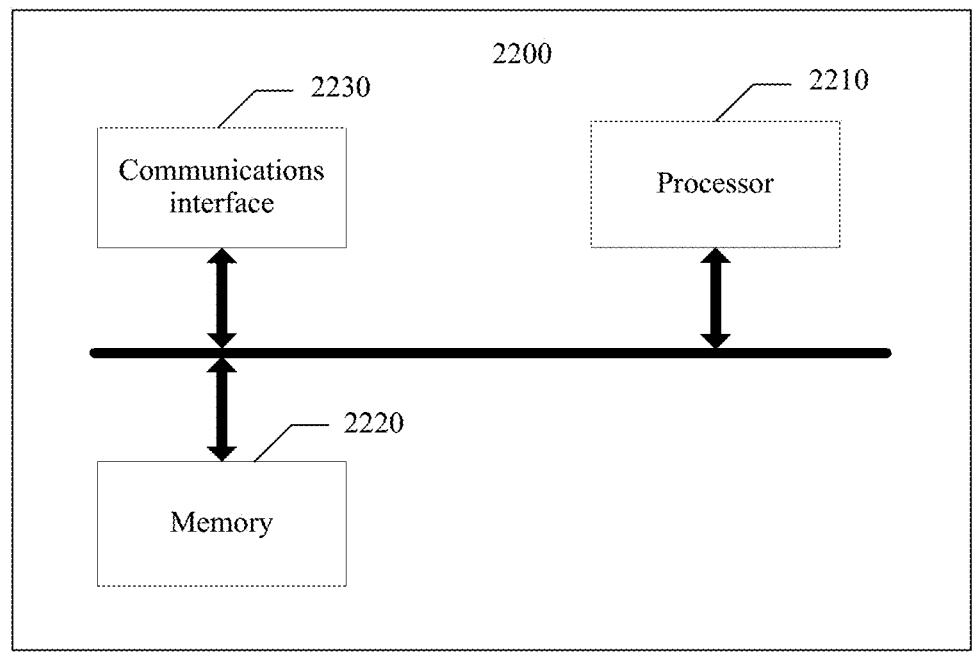
FIG. 22 is a schematic diagram of an apparatus according to an embodiment of this application.

Based on a same concept, FIG. 22 shows an apparatus 2200 provided in this application. The apparatus 2200 may be a network device, or may be an apparatus that can support the network device in implementing a function of the network device in the method in FIG. 9. For example, the apparatus 2200 may also be an apparatus (such as a chip or a chip system) in the network device. It should be noted that in the embodiments of this application, the chip system may include a chip, or may include a chip and another discrete device.

The apparatus 2200 includes at least one processor 2210, configured to implement a function of the base station in the access method provided in the embodiments of this application. The apparatus 2200 may further include at least one memory 2220, configured to store a program instruction and/or data. The memory 2220 is coupled to the processor 2210. The processor 2210 may cooperate with the memory 2220. The processor 2210 may execute the program instruction stored in the memory 2220. At least one of the at least one memory 2220 may be included in the processor 2210.

The apparatus 2200 may further include a communications interface 2230, and the apparatus 2200 may exchange information with another device by using the communications interface 2230. The communications interface 2230 may be a circuit, a bus, a transceiver, or any other apparatus that may be configured to perform information exchange. For example, the another device may be another terminal device or a network device. The processor 2210 may send and receive data by using the communications interface 2230. For example, the communications interface 2230 is configured to receive a preamble sequence on a PRACH resource.

In this embodiment of this application, a specific connection medium between the communications interface 2230, the processor 2210, and the memory 2220 is not limited. In this embodiment of this application, the memory 2220, the processor 2210, and the communications interface 2230 are connected by using a bus in FIG. 22. In FIG. 22, the bus is represented by a thick line. The foregoing is merely an example for description. Connection modes of other components are not limited thereto. The bus may be classified into an address bus, a data bus, a control bus, and the like. For ease of representation, only one thick line is used to represent the bus in FIG. 22, but this does not mean that there is only one bus or only one type of bus.

Figure 23:
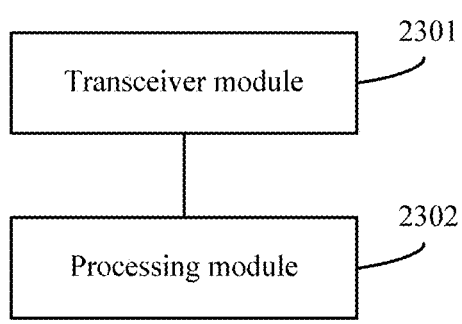
FIG. 23 is a schematic diagram of an apparatus according to an embodiment of this application.

FIG. 23 shows another embodiment of an apparatus provided in this application. The apparatus may be a network device or may be an apparatus (such as a chip or a chip system) in the network device, and can perform the foregoing method performed by a base station in any embodiment shown in FIG. 9.

The apparatus includes a transceiver module 2301 and a processing module 2302. The processing module 2302 is configured to: receive a preamble sequence on a PRACH resource by using the transceiver module 2301, where the PRACH resource corresponds to a first uplink BWP and a second uplink BWP; and send an RAR on a first downlink BWP and a second downlink BWP, where the RAR includes a response corresponding to the preamble sequence, the first uplink BWP corresponds to the first downlink BWP, and the second uplink BWP corresponds to the second downlink BWP.

It should be understood that the apparatus may be configured to implement steps performed by the terminal device in the resource configuration method in the embodiments of this application. For related features, refer to the foregoing descriptions. Details are not described herein again.

It should be understood that the module division of the apparatus shown in the embodiments of this application is an example, is merely logical function division, and may be other division in actual implementation. For example, a communications unit is divided into a receiving unit and a sending unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions described in the embodiments of this application are generated. The computer may be a general-purpose computer, a special-purpose computer, a computer network, a network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, through a coaxial cable, an optical fiber, or a digital subscriber line (DSL)) manner or a wireless (for example, through infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of a plurality of. A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (device), a computer-readable storage medium, or a computer program product. Therefore, this application may use a form of hardware only embodiments, software only embodiments, or embodiments with a combination of software and hardware. They are collectively referred to as "modules" or "systems".

This application is described with reference to the flowcharts and/or block diagrams of the method, the apparatus (device), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the embodiments thereof, apparently, various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. Apparently, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method comprising:
receiving, by a device, physical downlink control channel (PDCCH) signaling, wherein the PDCCH signaling triggers a random access procedure;
switching, by the device, to a target uplink bandwidth part (BWP), wherein the target uplink BWP comprises a physical random access channel (PRACH) resource, and wherein:
the target uplink BWP is an uplink BWP for initial random access; or
the target uplink BWP is a preconfigured uplink BWP, and the preconfigured uplink BWP comprises the PRACH resource; and
sending, by the device, in a first time unit, a preamble sequence on the PRACH resource comprised in the target uplink BWP, wherein there is a first time period between the first time unit and a second time unit, and the second time unit is a time unit in which the PDCCH signaling is received at the device.

2. The method according to claim 1, wherein the PDCCH signaling comprises an identifier of the target uplink BWP.

3. The method according to claim 1, wherein:
the first time period is an absolute time.

4. The method according to claim 1, wherein a subcarrier spacing corresponding to the first time unit is a subcarrier spacing of a downlink BWP, the PDCCH signaling is received on the downlink BWP, and a subcarrier spacing corresponding to the second time unit is a subcarrier spacing corresponding to the target uplink BWP.

5. The method according to claim 1, wherein the method further comprises:
receiving uplink timing advance (TA); and
sending data according to the uplink TA.

6. A method comprising:
sending, by a device, physical downlink control channel (PDCCH) signaling, wherein the PDCCH signaling triggers a random access procedure; and
in response to the random access procedure, receiving, by the device, a preamble sequence on a physical random access channel (PRACH) resource comprised in a target uplink bandwidth part (BWP), wherein:
the target uplink BWP is an uplink BWP for initial random access; or
the target uplink BWP is a preconfigured uplink BWP, and the preconfigured uplink BWP comprises the PRACH resource;
determining timing advance (TA) according to the preamble sequence; and
sending the TA on a target downlink BWP, wherein the target downlink BWP corresponds to the target uplink BWP or the target downlink BWP is a currently activated downlink BWP.

7. The method according to claim 6, wherein the PDCCH signaling comprises an identifier of the target uplink BWP.

8. An apparatus, comprising:
a non-transitory memory configured to store a program instruction; and
a processor configured to invoke and execute the program instruction stored in the non-transitory memory to:

receive physical downlink control channel (PDCCH) signaling, wherein the PDCCH signaling triggers a random access procedure;

switch to a target uplink bandwidth part (BWP), wherein the target uplink BWP comprises a physical random access channel (PRACH) resource, wherein:
the target uplink BWP is an uplink BWP for initial random access; or
the target uplink BWP is a preconfigured uplink BWP, and the preconfigured uplink BWP comprises the PRACH resource; and send, in a first time unit, a preamble sequence on the PRACH resource comprised in the target uplink BWP, wherein there is a first time period between the first time unit and a second time unit, and the second time unit is a time unit in which the PDCCH signaling is received at the apparatus.

9. The apparatus according to claim 8, wherein the PDCCH signaling comprises an identifier of the target uplink BWP.

10. The apparatus according to claim 8, wherein: the first time period is an absolute time.

11. The apparatus according to claim 8, wherein a subcarrier spacing corresponding to the first time unit is a subcarrier spacing of a downlink BWP, the PDCCH signaling is received on the downlink BWP, and a subcarrier spacing corresponding to the second time unit is a subcarrier spacing corresponding to the target uplink BWP.

12. The apparatus according to claim 8, wherein the processor is further configured to:
receive uplink timing advance (TA); and
send data according to the uplink TA.

13. The method according to claim 1, wherein the first time period is k third time units, a duration of each of the k third time units is predefined or notified by signaling, and k is a positive integer.

14. The apparatus according to claim 8, wherein the first time period is k third time units, a duration of each the k third time units is predefined or notified by using signaling, and k is a positive integer.

* * * * *